(12) United States Patent
Borran et al.

(10) Patent No.: US 8,843,069 B2
(45) Date of Patent: Sep. 23, 2014

(54) INTERFERENCE REDUCTION REQUEST IN A WIRELESS COMMUNICATION SYSTEM

(75) Inventors: Mohammad J. Borran, San Diego, CA (US); Aamod Khandekar, San Diego, CA (US); Naga Bhushan, San Diego, CA (US); Ashwin Sampath, Skillman, NJ (US); Alexei Gorokhov, San Diego, CA (US); Avneesh Agrawal, San Diego, CA (US); Ravi Palanki, San Diego, CA (US); Gavin B. Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1042 days.

(21) Appl. No.: 12/262,013

(22) Filed: Oct. 30, 2008

(65) Prior Publication Data

US 2009/0197538 A1 Aug. 6, 2009

Related U.S. Application Data

(60) Provisional application No. 61/025,564, filed on Feb. 1, 2008.

(51) Int. Cl.
*H04W 28/00* (2009.01)
*H04W 52/24* (2009.01)
*H04B 17/00* (2006.01)
*H04B 7/06* (2006.01)

(52) U.S. Cl.
CPC .............. *H04W 52/243* (2013.01); *Y02B 60/50* (2013.01); *H04B 17/0077* (2013.01); *H04B 7/0617* (2013.01); *H04W 52/247* (2013.01)
USPC .......... 455/63.1; 455/296; 455/101; 455/501; 455/502; 455/503; 455/504; 455/506; 370/331

(58) Field of Classification Search
CPC .................................................. H04W 28/048
USPC ........ 455/63.1, 296, 101, 501, 502, 503, 504, 455/506; 370/331
See application file for complete search history.

(56) References Cited

U.S. PATENT DOCUMENTS 7,010,317 B2   3/2006   Hwang et al.
7,092,732 B2   8/2006   Tamaki et al.
(Continued)

FOREIGN PATENT DOCUMENTS

CN   1271500 A   10/2000
CN   1640167 A   7/2005
(Continued)

OTHER PUBLICATIONS

International Search Report PCT/US2008/083462—International Search Authority—European Patent Office, Mar. 17, 2009.
(Continued)

*Primary Examiner* — Wen Huang
(74) *Attorney, Agent, or Firm* — Anthony R. Morris

(57) ABSTRACT

Techniques for transmitting data with short-term interference mitigation in a wireless communication system are described. In one design, a first station (e.g., a base station or a terminal) may send a first message to at least one interfering station to request reduction of interference on at least one resource. The first station may send the first message in anticipation of receiving data on the at least one resource. An interfering station may receive the first message from the first station and may reduce interference on the at least one resource by reducing its transmit power and/or by steering its power in a direction different from the first station. The first station may thereafter receive data from a second station on the at least one resource. The techniques may be used for data transmission on the forward and reverse links.

43 Claims, 12 Drawing Sheets

(56) References Cited

U.S. PATENT DOCUMENTS

| | | | |
|---|---|---|---|
| 7,643,844 B2 | 1/2010 | Kwak et al. | |
| 2003/0100312 A1 | 5/2003 | Takahashi | |
| 2005/0254513 A1* | 11/2005 | Cave et al. | 370/445 |
| 2006/0014554 A1 | 1/2006 | Gerlach | |
| 2006/0084460 A1 | 4/2006 | Matsuo et al. | |
| 2006/0234752 A1 | 10/2006 | Mese et al. | |
| 2007/0006057 A1 | 1/2007 | Wallner et al. | |
| 2007/0025288 A1* | 2/2007 | Nagai et al. | 370/329 |
| 2007/0060057 A1 | 3/2007 | Matsuo et al. | |
| 2007/0082619 A1 | 4/2007 | Zhang et al. | |
| 2007/0105574 A1 | 5/2007 | Gupta et al. | |
| 2007/0207828 A1 | 9/2007 | Cheng et al. | |
| 2007/0211813 A1 | 9/2007 | Talwar et al. | |
| 2007/0280170 A1 | 12/2007 | Kawasaki | |
| 2008/0062925 A1* | 3/2008 | Mate et al. | 370/331 |
| 2009/0124205 A1* | 5/2009 | Aboba et al. | 455/63.1 |
| 2009/0130980 A1 | 5/2009 | Palanki et al. | |
| 2009/0197590 A1 | 8/2009 | Borran et al. | |
| 2009/0197629 A1 | 8/2009 | Borran et al. | |
| 2009/0227263 A1 | 9/2009 | Agrawal et al. | |

FOREIGN PATENT DOCUMENTS

| | | | |
|---|---|---|---|
| CN | 1722653 A | | 1/2006 |
| CN | 1784862 A | | 6/2006 |
| EP | 0949768 A2 | | 10/1999 |
| EP | 1475924 A1 | | 11/2004 |
| EP | 1617691 A1 | | 1/2006 |
| EP | 1816883 A1 | | 8/2007 |
| EP | 1850612 A1 | | 10/2007 |
| JP | 2008503925 | | 2/2008 |
| JP | 2009506652 A | | 2/2009 |
| JP | 2009514444 | | 4/2009 |
| RU | 2005138507 A | | 4/2006 |
| WO | 06007316 | | 1/2006 |
| WO | WO2006037377 | | 4/2006 |
| WO | 2006087797 A1 | | 8/2006 |
| WO | 07024895 | | 3/2007 |
| WO | WO2007044281 | | 4/2007 |
| WO | 07051152 | | 5/2007 |
| WO | WO2007112416 | | 10/2007 |
| WO | WO2007146891 | | 12/2007 |
| WO | WO2009039404 | | 3/2009 |

OTHER PUBLICATIONS

Written Opinion PCT/US2008/083462—International Search Authority—European Patent Office, Mar. 17, 2009.

3GPP TSG RAN, FDD Enhanced Uplink, Overall Description, Stage 2 Release 6, 3GPP TS 25.309, v6.6.0, Mar. 1, 2006, pp. 1-34 (pp. 21-29).

"3rd Generation Partnership Project ; Technical Specification Group Radio Access Network; Radio Resource Control ( RRC); Protocol Specification (Release 5)" 3GPP Standard; 3GPP TS 25.331, 3rd Generation Partnership Project (3GPP), Mobile Compete NCE Centre; 650, Route des Lucioles ; F-06921 Sophia-Antipolis Cedex , France, No. V5.21.0, Dec. 1, 2007 , pp. 1-1045, XP050367971 p. 82-p. 84 p. 206-p. 226.

"3rd Generation Partnership Project; Technical Specification Group Radio Access Network ; FDD Enhanced Up l ink; Overall descr i pt i on; Stage 2 (Re l ease 6)" 3GPP Standard; 3GPP TS 25.309, 3rd Generation Partnership Project (3GPP), Mobi le Competence Centre, 650, Route des Lucioles , F-06921 Sophia-Antipolis Cedex , France, No. V6.6.0 , Mar. 1, 2006, pp. 1-34 ,XP050367622 p. 19-p. 26.

International Search Report & Written Opinion—PCT/US2008/083139—International Search Authority—European Patent Office—Apr. 9, 2010.

International Search Report/Written Opinion—PCT/US08/083460—International Search Authority EPO—Apr. 27, 2010.

Samsung: "Uplink Control Signalling Structure," 3GPP Draft, R1-041373 UL Signalling, 3GPP RAN WG1 Meeting #39, Yokohama, JP, Nov. 12, 2004, pp. 1-2.

Samsung: "Node B controlled scheduling", 3GPP Draft; R1-040851, 3rd Generation Partnership Project (3GPP), Mobile Competence Centre ; 650, Route des Lucioles ; F-06921 Sophia-Antipolis Cedex ; France, vol. RAN WG1, No. Prague, Czech Republic; Aug. 12, 2004, XP050099060.

Taiwan Search Report—TW097144568—TIPO—Apr. 2, 2012.

\* cited by examiner

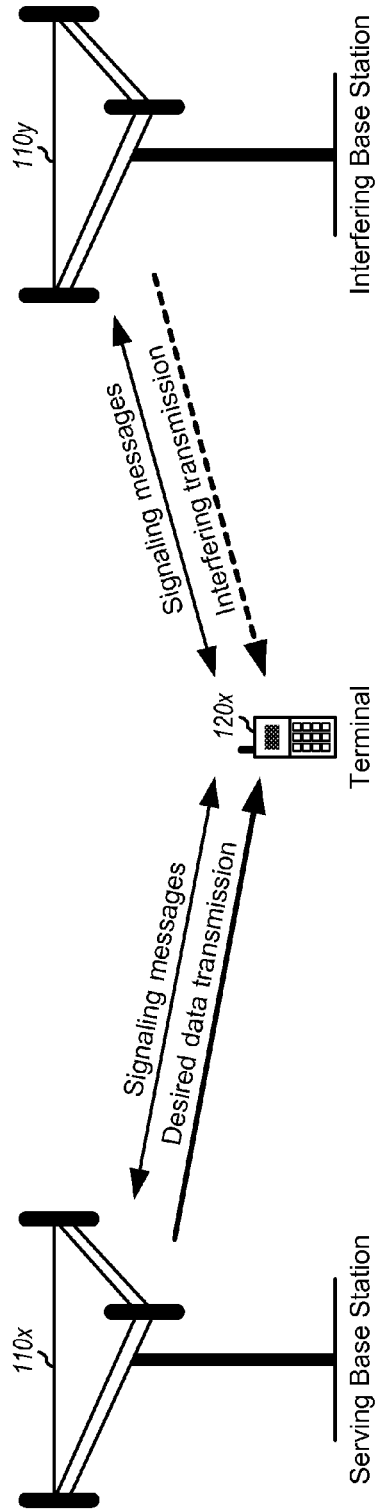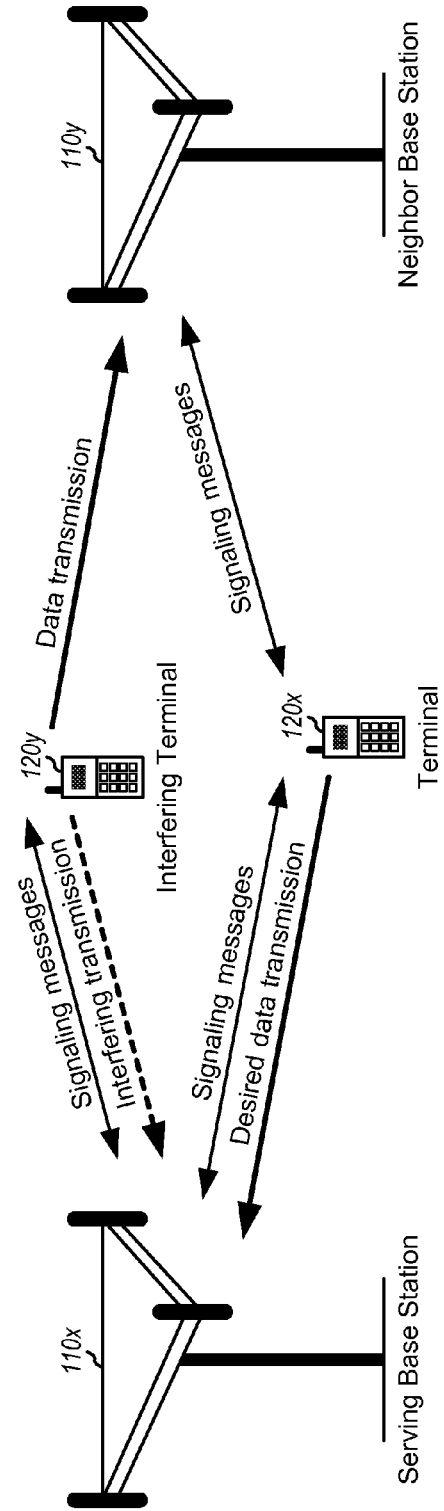

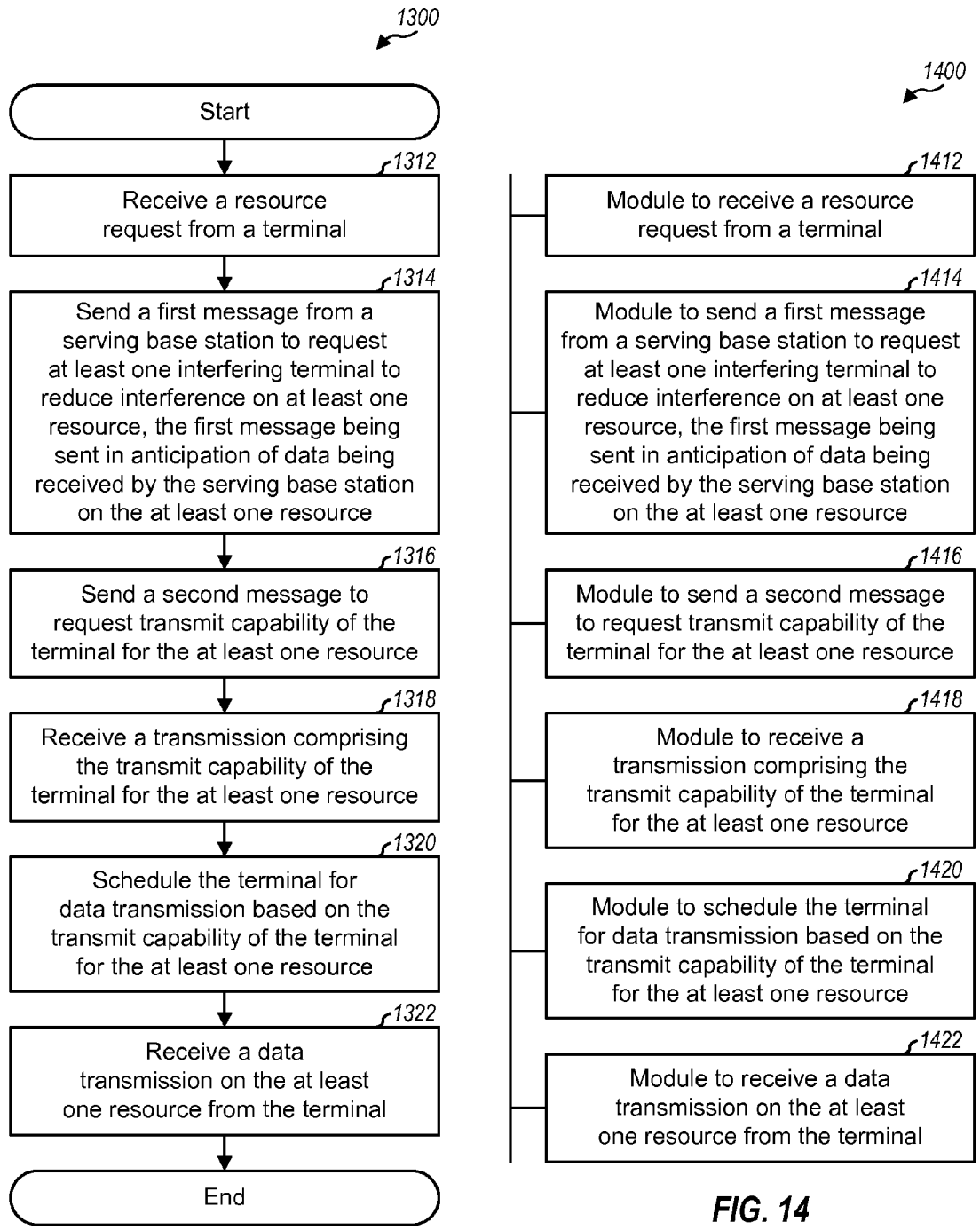

INTERFERENCE REDUCTION REQUEST IN A WIRELESS COMMUNICATION SYSTEM

CLAIM OF PRIORITY UNDER 35 U.S.C. §119

The present application claims priority to provisional U.S. Application Ser. No. 61/025,564, entitled "METHOD AND APPARATUS FOR SHORT-TERM INTERFERENCE AVOIDANCE," filed Feb. 1, 2008, assigned to the assignee hereof and incorporated herein by reference.

CROSS REFERENCE TO RELATED APPLICATIONS

This application is related to concurrently filed and commonly owned U.S. patent application Ser. No. 12/261,998, entitled "SHORT-TERM INTERFERENCE MITIGATION IN A WIRELESS COMMUNICATION SYSTEM," and U.S. patent application Ser. No. 12/262,022, entitled "POWER DECISION PILOT FOR A WIRELESS COMMUNICATION SYSTEM," the disclosure of each of which is hereby incorporated by reference herein.

BACKGROUND

I. Field

The present disclosure relates generally to communication, and more specifically to data transmission techniques for a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of terminals. A terminal may communicate with a base station via the forward and reverse links. The forward link (or downlink) refers to the communication link from the base station to the terminal, and the reverse link (or uplink) refers to the communication link from the terminal to the base station.

A base station may transmit data to one or more terminals on the forward link and may receive data from one or more terminals on the reverse link. On the forward link, data transmission from the base station may observe interference due to data transmissions from neighbor base stations. On the reverse link, data transmission from each terminal may observe interference due to data transmissions from other terminals communicating with the neighbor base stations. For both the forward and reverse links, the interference due to interfering base stations and interfering terminals may degrade performance.

There is therefore a need in the art for techniques to mitigate interference in order to improve performance.

SUMMARY

Techniques for transmitting data with short-term interference mitigation in a wireless communication system are described herein. The techniques may be used to mitigate (e.g., to avoid or reduce) interference from interfering base stations or interfering terminals in order to improve performance. The interference mitigation may be short term and applied for a packet, a set of packets, a frame, a set of frames, etc. The interference mitigation may be invoked when high interference is observed instead of all the time. The techniques may be used for data transmission on the forward link as well as the reverse link.

In one design, a first station may generate a first message to request reduction of interference. The first message may include information identifying at least one resource on which to reduce interference, an indication of the priority of the request, a target interference level for the first station, spatial information for beamsteering, and/or other information. The first station may send the first message to at least one interfering station to request reduction of interference on the at least one resource, e.g., in anticipation of receiving data on the at least one resource. The first station may thereafter receive data from a second station on the at least one resource.

In one design, an interfering station may receive the first message from the first station. The interfering station may determine whether to grant or dismiss the request, e.g., based on the priority of the request. The interfering station may reduce interference on the at least one resource by reducing its transmit power on the at least one resource and/or by steering its power in a direction different from the first station.

For data transmission on the forward link, the first station may be a terminal, and the second station may be a serving base station. The terminal may receive a second message to trigger short-term interference mitigation from the serving base station and may send the first message to request reduction of interference in response to receiving the second message. For data transmission on the reverse link, the first station may be a serving base station, and the second station may be a terminal. The serving base station may receive a resource request from the terminal and may send the first message in response to receiving the resource request.

Various aspects and features of the disclosure are described in further detail below.

BRIEF DESCRIPTION OF THE DRAWINGS

FIG. 4 shows data transmission on the forward link (FL).

FIG. 6 shows data transmission on the reverse link (RL).

FIGS. 13 and 14 show a process and an apparatus, respectively, for receiving data on the reverse link with short-term interference mitigation.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

Figure 1:
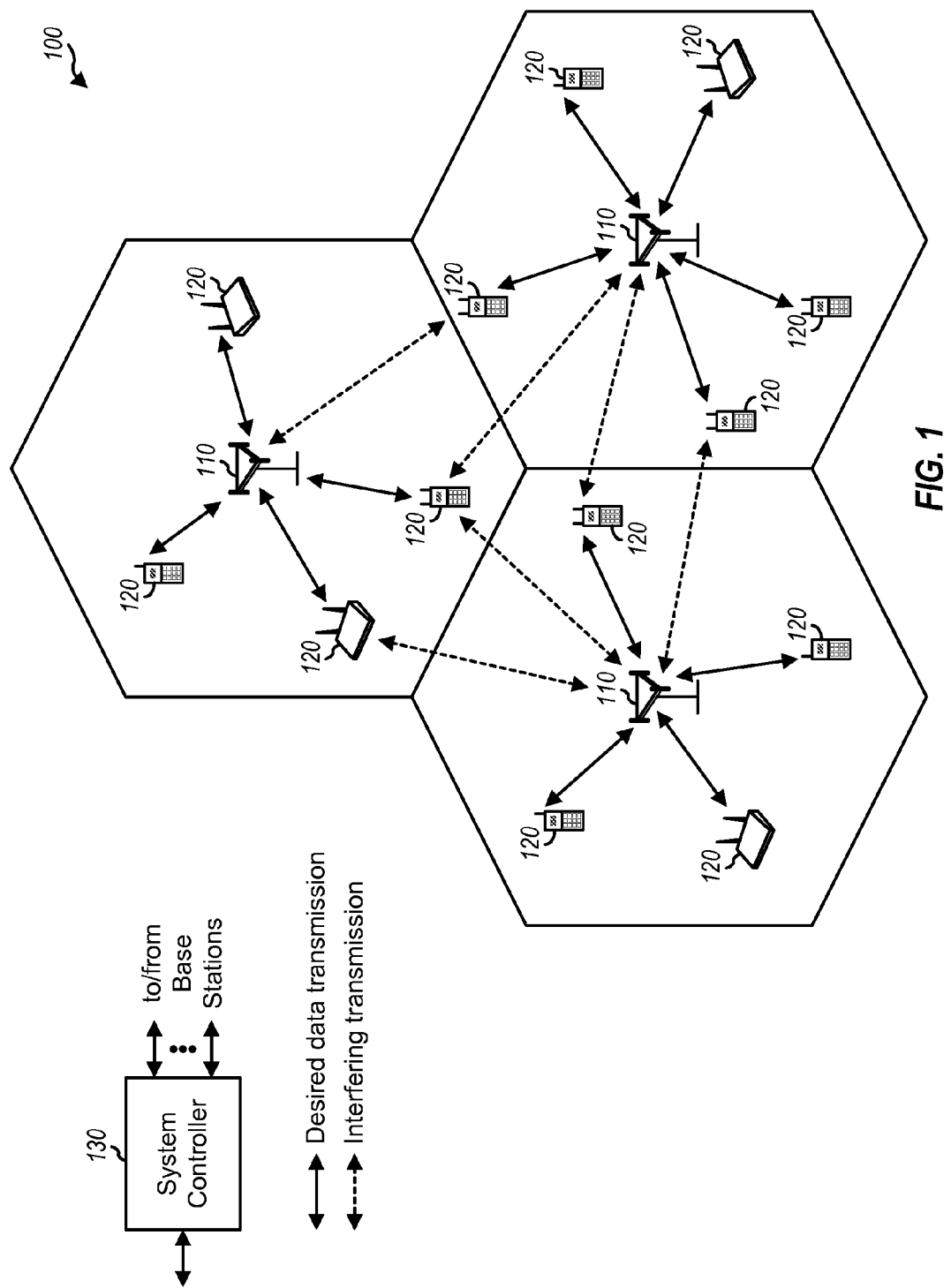
FIG. 1 shows a wireless communication system.

FIG. 1 shows a wireless communication system 100, which may include a number of base stations 110 and other network entities. A base station may be a fixed station that communicates with the terminals and may also be referred to as an access point, a Node B, an evolved Node B, etc. Each base station 110 may provide communication coverage for a particular geographic area. The term "cell" can refer to a coverage area of a base station and/or a base station subsystem serving this coverage area, depending on the context in which the term is used. A base station may provide communication coverage for a macro cell, a pico cell, a femto cell, and/or other types of cell. A macro cell may cover a relatively large geographic area (e.g., several kilometers in radius) and may support communication for all terminals with service subscription in the system. A pico cell may cover a relatively small geographic area and may support communication for all terminals with service subscription. A femto cell may cover a relatively small geographic area (e.g., a home) and may support communication for a set of terminals having association with the femto cell (e.g., terminals belonging to residents of the home). The terminals supported by a femto cell may belong in a closed subscriber group (CSG). The techniques described herein may be used for all types of cell.

A system controller 130 may couple to a set of base stations and provide coordination and control for these base stations. System controller 130 may be a single network entity or a collection of network entities. System controller 130 may communicate with the base stations via a backhaul, which is not shown in FIG. 1 for simplicity.

Terminals 120 may be dispersed throughout the system, and each terminal may be stationary or mobile. A terminal may also be referred to as an access terminal, a mobile station, a user equipment, a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a serving base station and may cause interference to and/or receive interference from one or more interfering base stations. A serving base station is a base station designated to serve a terminal on the forward and/or reverse link. An interfering base station is a base station causing interference to a terminal on the forward link. An interfering terminal is a terminal causing interference to a base station on the reverse link. In FIG. 1, a solid line with double arrows indicates a desired data transmission between a terminal and a serving base station. A dashed line with double arrows indicates an interfering transmission between a terminal and an interfering base station.

The system may support HARQ in order to improve reliability of data transmission. For HARQ, a transmitter may send a transmission of data and may send one or more additional transmissions, if needed, until the data is decoded correctly by a receiver, or the maximum number of transmissions has been sent, or some other termination condition is encountered.

Figure 2:
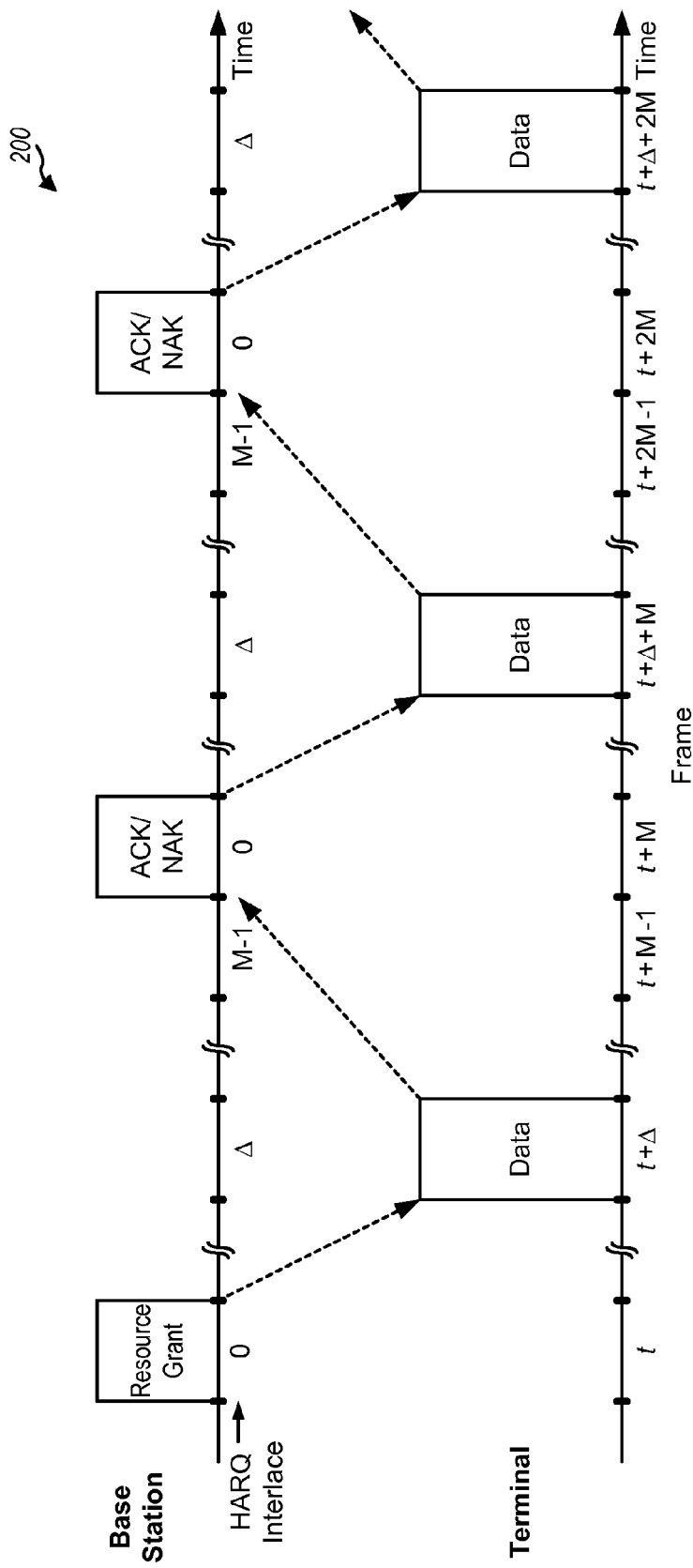
FIG. 2 shows data transmission with hybrid automatic retransmission (HARQ).

FIG. 2 shows an example data transmission on the reverse link with HARQ. The transmission timeline may be partitioned into units of frames. Each frame may cover a predetermined time duration, e.g., 1 milliseconds (ms). A frame may also be referred to as a subframe, a slot, etc.

A terminal may have data to send on the reverse link and may send a resource request (not shown in FIG. 2). A serving base station may receive the resource request and may return a resource grant. The terminal may process a packet of data and send a transmission of the packet on the granted resource. The serving base station may receive the transmission from the terminal and decode the packet. The serving base station may send an acknowledgement (ACK) if the packet is decoded correctly or a negative acknowledgement (NAK) if the packet is decoded in error. The terminal may receive the ACK/NAK feedback, send another transmission of the packet if a NAK is received, and either terminate or send a transmission of a new packet if an ACK is received.

M HARQ interlaces with indices of 0 through M−1 may be defined for each of the forward and reverse links, where M may be equal to 4, 6, 8 or some other integer value. The HARQ interlaces may also be referred to as HARQ instances. Each HARQ interlace may include frames that are spaced apart by M frames. For example, HARQ interlace m may include frames m, m+M, m+2M, etc., where m∈{0, . . . , M−1}. A packet may be sent on one HARQ interlace, and all transmissions of the packet may be sent in frames that are spaced apart by M frames. Each transmission of the packet may be referred to as an HARQ transmission.

The M HARQ interlaces for the forward link may be associated with the M HARQ interlaces for the reverse link. In one design, HARQ interlace m on the forward link may be associated with HARQ interlace r={(m+Δ)mod M} on the reverse link, where Δ is a frame offset between the forward and reverse links, and "mod" denotes a modulo operation. In one design, Δ may be equal to M/2, and each HARQ interlace on the forward link may be associated with an HARQ interlace on the reverse link that is M/2 frames away.

The system may utilize orthogonal frequency division multiplexing (OFDM) or single-carrier frequency division multiplexing (SC-FDM) for each of the forward and reverse links. OFDM and SC-FDM partition the system bandwidth into multiple (K) orthogonal subcarriers, which are also commonly referred to as tones, bins, etc. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively. Each subcarrier may be modulated with data. In general, modulation symbols are sent in the frequency domain with OFDM and in the time domain with SC-FDM.

In one design, the K total subcarriers may be grouped into resource blocks. Each resource block may include N subcarriers (e.g., N=12 subcarriers) in one slot. A slot may span 0.5 ms or some other duration. The available resource blocks may be assigned to the terminals for data transmission.

In another design, a channel tree may be used to identify resources. The channel tree may constrain grouping of resources, which may reduce overhead to convey the resources.

Figure 3:
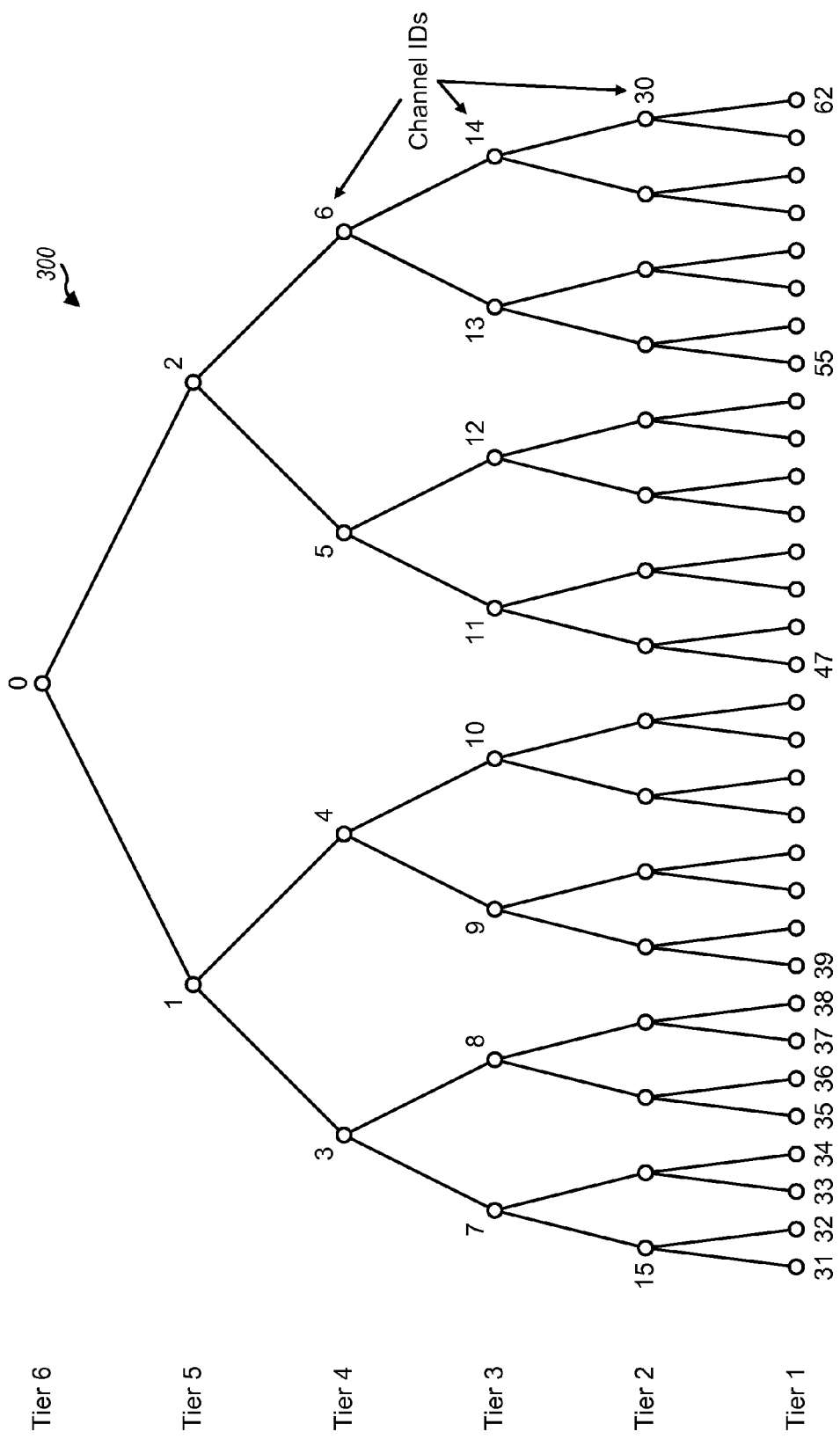
FIG. 3 shows a binary channel tree for a set of subcarriers.

FIG. 3 shows a design of a channel tree 300 for a case in which 32 subcarrier sets are available. Each subcarrier set may include a predetermined number of subcarriers. In channel tree 300, 32 nodes may be formed in tier 1 with the 32 subcarrier sets, 16 nodes may be formed in tier 2 with the 32 nodes in tier 1, eight nodes may be formed in tier 3 with the 16 nodes in tier 2, four nodes may be formed in tier 4 with the eight nodes in tier 3, two nodes may be formed in tier 5 with the four nodes in tier 4, and one node may be formed in tier 6 with the two nodes in tier 5. Each node in tiers 2 through 6 may be formed with two nodes in the tier immediately below.

Each node in the channel tree may be assigned a unique channel identifier (ID). The nodes may be assigned sequentially numbered channel IDs from top to bottom and from left to right for each tier, as shown in FIG. 3. The topmost node may be assigned a channel ID of 0 and may include all 32 subcarrier sets. The 32 nodes in the lowest tier 1 may be assigned channel IDs of 31 through 62 and may be called base nodes.

The tree structure shown in FIG. 3 places certain restrictions on assignment of subcarriers. For each node that is assigned, all nodes that are subsets (or descendants) of the assigned node and all nodes for which the assigned node is a subset are restricted. The restricted nodes are not used concurrently with the assigned node so that no two nodes use the same subcarrier set at the same time.

The available frequency and/or time resources may also be partitioned and identified in other manners. The K total subcarriers may also be partitioned into subbands. Each subband may include a predetermined number of subcarriers, e.g., 72 subcarriers in 1.08 MHz.

A terminal may communicate with a serving base station on the forward and/or reverse link. On the forward link, the terminal may observe high interference from an interfering base station. This may be the case, e.g., if the serving base station covers a pico cell or a femto cell and has much lower transmit power than the interfering base station. On the reverse link, the serving base station may observe high interference from an interfering terminal. The interference on each link may degrade performance of data transmission sent on that link. The interference mitigation may also steer the interfering transmission away from a station observing high interference.

In an aspect, short-term interference mitigation may be used to mitigate (e.g., to avoid or reduce) interference on a given link in order to improve performance of data transmission. The interference mitigation may blank or reduce transmit power of interfering transmissions so that a higher signal-to-noise-and-interference ratio (SINR) can be achieved for a desired data transmission.

A set of messages and/or a set of control channels may be used to support short-term interference mitigation on the forward link (FL) and reverse link (RL). Table 1 lists a set of messages that may be used for short-term interference mitigation, in accordance with one design. A pilot is a transmission that is known a priori by both a transmitter and a receiver and may also be referred to as a reference signal, a preamble, a training sequence, etc. A pilot may be considered as a message that carries information in the signal itself instead of its content.

TABLE 1

| Message/Pilot | Description |
|---|---|
| Interference mitigation trigger | Message sent to a terminal to trigger short-term interference mitigation and to request the terminal to clear interference from interfering base stations on the forward link. |
| Transmit capability request | Message sent to a terminal to request transmit capability of the terminal, e.g., to trigger transmission of a power decision pilot by the terminal on the reverse link. |
| FL resource grant | Message assigning forward link resource to a terminal. |
| RL resource grant | Message assigning reverse link resource to a terminal. |
| Reduce interference request | Message asking interfering base stations or interfering terminals to reduce interference on specified resource(s). |
| Power decision pilot | Pilot sent at a power level and/or a beam direction to be used by an interfering base station or an interfering terminal on the specified resource(s). |
| Resource quality indicator | Indicate channel quality of the specified resource(s). |

The messages in Table 1 may also be referred to by other names. For example, the interference mitigation trigger message may also be referred to as a pre forward link assignment block (pre-FLAB), the transmit capability request message may also be referred to as a pre reverse link assignment block (pre-RLAB), the FL resource grant may also be referred to as a forward link assignment block (FLAB), the RL resource grant may also be referred to as a reverse link assignment block (RLAB), and the reduce interference request message may also be referred to as a resource utilization message (RUM). Different and/or additional messages may also be used for short-term interference mitigation. The information carried by the messages in Table 1 may also be conveyed in other manners. For example, the transmit power level to be used on a resource may be sent in a message instead of conveyed in a pilot. For clarity, much of the description below assumes the use of the messages shown in Table 1.

Short-term interference mitigation may be achieved through use of reduce interference request messages. These messages may be sent by terminals to contend for resources on the forward link and may also be sent by base stations to contend for resources on the reverse link. These messages may enable orthogonalization of data transmissions across neighboring cells on a short-term basis.

In general, a resource may cover any frequency and/or time dimension and may be conveyed in any manner. In one design, a resource may cover a variable frequency dimension and may be identified by a channel ID for a node on a channel tree, e.g., as shown in FIG. 3. In another design, a resource may cover a fixed frequency dimension, e.g., a predetermined number of subcarriers. A resource may also cover a fixed or variable time duration. As some examples, a resource may cover a specific subband in a specific frame, a specific resource block, a specific time frequency block, etc.

FIG. 4 shows data transmission on the forward link in the presence of interference. A serving base station 110x may send a data transmission on the forward link to a terminal 120x. Terminal 120x may also receive an interfering transmission from an interfering base station 110y. This interfering transmission may be intended for another terminal not shown in FIG. 4. If the desired data transmission and the interfering transmission are sent on the same resource, then terminal 120x may not be able to decode the data transmission from serving base station 110x.

Terminal 120x may not be communicating with interfering base station 110y for data transmission. Nevertheless, terminal 120x may be able to reliably send messages to and receive messages from interfering base station 110y. In one design, messages such as those shown in Table 1 may be sent on resources allocated for these messages. These messages may then avoid interference due to other transmissions. In general, the messages used for short-term interference mitigation may be sent in any manner such that they can be reliably received by the recipient base stations/terminals, even when there are dominant interferers.

Figure 5:
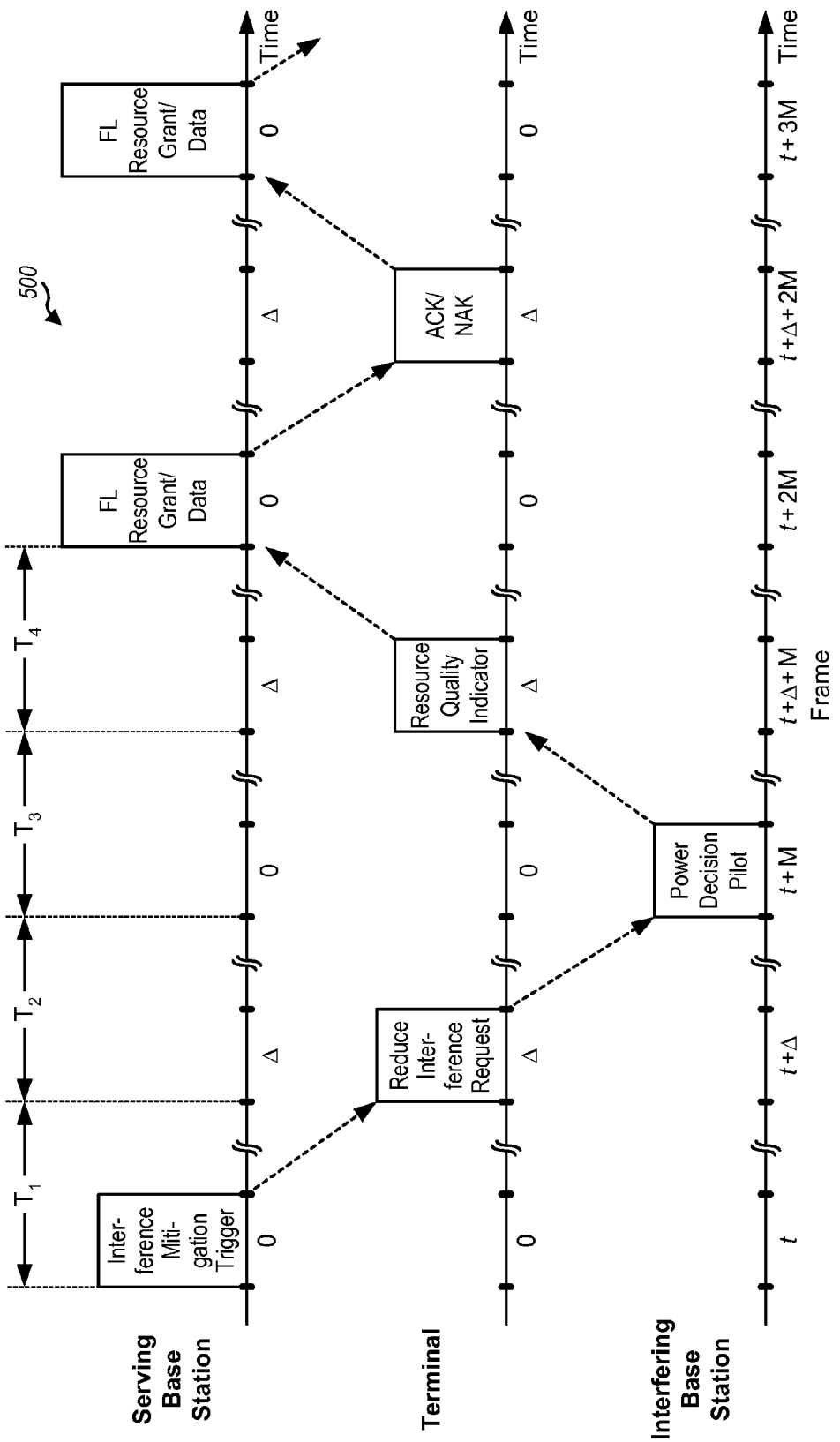
FIG. 5 shows FL data transmission with short-term interference mitigation.

FIG. 5 shows a timing diagram of a design of a scheme 500 for forward link data transmission with short-term interference mitigation. A serving base station may have data to send to a terminal and may have knowledge that the terminal is observing high interference on the forward link. The serving base station may receive pilot measurement reports from the terminal, and the reports may indicate and/or identify strong interfering base stations.

The serving base station may send an interference mitigation trigger message (or simply, a trigger message) to the terminal in frame t to trigger short-term interference mitigation. The trigger message may direct the terminal to ask interfering base stations to reduce interference on the forward link. The serving base station may also send the trigger message in order to obtain an accurate channel quality report from the terminal and may use this report to make a decision on short-term interference mitigation. In any case, the trigger message may identify one or more specific resources on which to reduce interference, a priority of the data to send, and/or other information. Each specified resource may be given by a channel ID for a channel tree, a subband index, a resource block index, etc.

The terminal may receive the trigger message from the serving base station and may send a reduce interference request message on the reverse link in frame t+Δ. In one design, the terminal may send the reduce interference request message only to base stations that are dominant interferers to the terminal on the forward link. The terminal may identify these dominant interfering base stations based on forward link pilots received from these base stations. In another design, the terminal may send the reduce interference request message to all neighbor base stations that can receive the message. In general, the reduce interference request message may be a unicast message sent to a specific base station, a multi-cast message sent to a set of base stations, or a broadcast message sent to all base stations. In any case, the reduce interference request message may ask the interfering base stations to reduce interference on one or more specified resources, e.g., to blank transmission on the specified resource(s), to reduce transmit power to an acceptable level, or to beamsteer in a direction different from the terminal. The reduce interference request message may include a priority metric indicating the urgency of the request, which may be used by the interfering base stations in making decisions on whether to grant or dismiss the request. The specified resource(s) and the priority metric sent in the reduce interference request message may be obtained directly from the interference mitigation trigger message or may be determined in other manners. The reduce interference request message may be sent A frames from when the trigger message was received, as shown in FIG. 5, where A may be a fixed offset between a forward link HARQ interlace and an associated reverse link HARQ interlace.

An interfering base station may receive the reduce interference request message from the terminal and may decide to reduce or blank transmission on the one or more specified resources. The interfering base station may determine a transmit power level that it will use on each specified resource based on its forward link buffer status, the reduce interference request messages received from other terminals for that specified resource, etc. For example, the interfering base station may determine whether to grant or dismiss the reduce interference request message based on the priority metric in the message, the forward link buffer status of the interfering base station, etc. The interfering base station may also determine the transmit power level that it will use for each specified resource based on the received powers and/or contents of the reduce interference request messages from all terminals. For example, the interfering base station may estimate the pathloss for each terminal based on the received power of the reduce interference request message from that terminal. The interfering base station may then determine the transmit power level that it will use based on the estimated pathloss for the terminal and target interference levels for the other terminals.

In one design, the interfering base station may convey the transmit power level that it will use for each specified resource via a power decision pilot sent at that transmit power level (or a related transmit power level) on a corresponding resource. The corresponding resource may cover the same frequency as the specified resource but may occur M frames earlier on the same forward link HARQ interlace. The interfering base station may send the power decision pilot on the corresponding resource in frame t+M, and the transmit power level for this pilot may be related to (e.g., equal to) the transmit power level that the interfering base station intend to use for the specified resource in frame t+2M. The transmit power level indicated via the power decision pilot may be a tentative transmit power decision. The interfering base station may use a higher or lower transmit power level on a specified resource based on quality of service (QoS), channel quality conditions, and/or other factors. Although not shown in FIG. 5, the serving base station may also receive reduce interference requests from other terminals observing high interference from this base station. The serving base station may also send a power decision pilot to these other terminals or may broadcast the power decision pilot to all terminals that can receive the pilot.

The terminal may receive power decision pilots from all interfering base stations and may estimate the channel quality for each specified resource based on the received pilots. The power decision pilots may allow the terminal to more accurately estimate the channel quality. The terminal may determine a resource quality indicator (RQI) value for each specified resource based on the estimated channel quality for that resource and estimated interference levels. For example, an RQI value for a given resource may be determined based on (i) the channel quality estimated based on the pilot from the serving base station and (ii) the interference estimated based on the pilots from the interfering base stations. The terminal may also determine a single RQI value for all specified resources. In any case, an RQI value may indicate an SINR value, a data rate, or some other information for the resource(s) covered by the RQI value. The terminal may send RQI information comprising one or more RQI values for the corresponding resource(s) in frame t+Δ+M. The RQI information may also be referred to as channel quality indicator (CQI) information.

The serving base station may receive the RQI information from the terminal and may schedule the terminal for data transmission on one or more assigned resources. Each assigned resource may correspond to all or a subset of a specified resource. The serving base station may select a modulation and coding scheme (MCS) based on the RQI information for the assigned resource(s). A MCS may also be referred to as a transport format, a packet format, a rate, etc. The serving base station may process data for the terminal in accordance with the MCS. The serving base station may generate an FL resource grant, which may include the assigned resource(s), the MCS, and/or other information. The serving base station may send the FL resource grant and a transmission of data to the terminal in frame t+2M.

The terminal may receive the FL resource grant from the serving base station and may obtain the assigned resource(s) and the MCS. The terminal may receive the transmission of data on the assigned resource(s), decode the received transmission in accordance with the MCS, and generate an ACK or a NAK based on the decoding result. The terminal may send the ACK or NAK to the serving base station in frame t+Δ+2M. The serving base station may send another transmission of the data in frame t+3M if a NAK is received and may either terminate or send a transmission of new data if an ACK is received.

FIG. 5 shows a specific design of short-term interference mitigation on the forward link. Short-term interference mitigation on the forward link may also be implemented with other designs.

The reduce interference request message may ask an interfering base station to reduce interference by reducing transmit power (as described above) and/or by beamsteering its power in a direction different from the terminal, e.g., by placing the terminal in a spatial null. Beamsteering may be performed based on spatial information, which may comprise preceding weights (e.g., a preceding matrix or vector), a channel estimate, and/or other information used by a transmitter to spatially steer its power. The spatial information may be obtained or provided in various manners. In one design, the reduce interference request message may include a terminal ID. A spatial channel between an interfering base station and the terminal may be known to the interfering base station, e.g., on a long-term basis. In another design, the message may be sent in a unicast manner to an interfering base station and may include information on the spatial channel or a preferred beam between that base station and the terminal. In yet another design, reciprocity between the forward and reverse links may be assumed, e.g., due to use of time division duplexing (TDD). An interfering base station may then estimate a reverse link channel for the terminal based on the message and may use the reverse link channel estimate as a forward link channel estimate. For all of the designs, an interfering base station may derive preceding weights based on information on the spatial channel or may be provided with the preceding weights. The interfering base station may then perform beamsteering with the preceding weights.

In the design shown in FIG. 5, the interfering base station may transmit a power decision pilot at the transmit power level that will be used on the specified resource(s). In another design, the interfering base station does not transmit a power decision pilot and does not sent a message in response to the reduce interference request message from the terminal. In this design, an assumption may be made that the interfering base station will not transmit on the specified resource(s), and the RQI may be determined assuming no interference from the interfering base station. In yet another design, the interfering base station does not transmit a power decision pilot or a message if it will not transmit on the specified resource(s) and transmits a power decision pilot or a message if it will transmit on the specified resource(s). In yet another design, the interfering base station may send a message containing the transmit power level that it will use on the specified resource(s). In yet another design, the interfering base station may provide spatial information in the power decision pilot. For example, the interfering base station may indicate a beam direction in addition to the transmit power level to be used on the specified resource(s) in a future frame. The interfering base station may achieve this by adjusting the transmit power for each transmit antenna at the base station. In yet another design, the interfering base station may send spatial information (e.g., preceding weights) separate from and in addition to the power decision pilot.

In one design, the interfering base station may reduce interference for one HARQ transmission, which may be for the first transmission of a packet. The same procedure may be repeated for each HARQ transmission to reduce interference. In another design, the interfering base station may reduce interference for L HARQ transmissions (e.g., on the same HARQ interlace), where L may be any integer value. For example, a packet may be processed (e.g., encoded and modulated) such that it can be reliably decoded after a target number of HARQ transmissions, and L may be equal to this target number. In yet another design, the interfering base station may reduce interference for multiple HARQ interlaces. The identities of these HARQ interlaces may be conveyed in the interference mitigation trigger message and/or the reduce interference request message. Alternatively, these HARQ interlaces may be known a priori by all base stations and terminals and would not need to be sent.

FIG. 6 shows data transmission on the reverse link in the presence of interference. Terminal $120x$ may send a data transmission on the reverse link to serving base station $110x$. Serving base station $110x$ may also receive an interfering transmission from an interfering terminal $120y$. This interfering transmission may be intended for neighbor base station $110y$. If the desired data transmission and the interfering transmission are sent on the same resource, then serving base station $110x$ may not be able to decode the data transmission from terminal $120x$. Terminal $120x$ may not be communicating with base station $110y$ for data transmission. Nevertheless, terminal $120x$ may be able to reliably send messages to and receive messages from base station $110y$. Similarly, interfering terminal $120y$ may be able to reliably exchange messages with serving base station $110x$.

Figure 7:
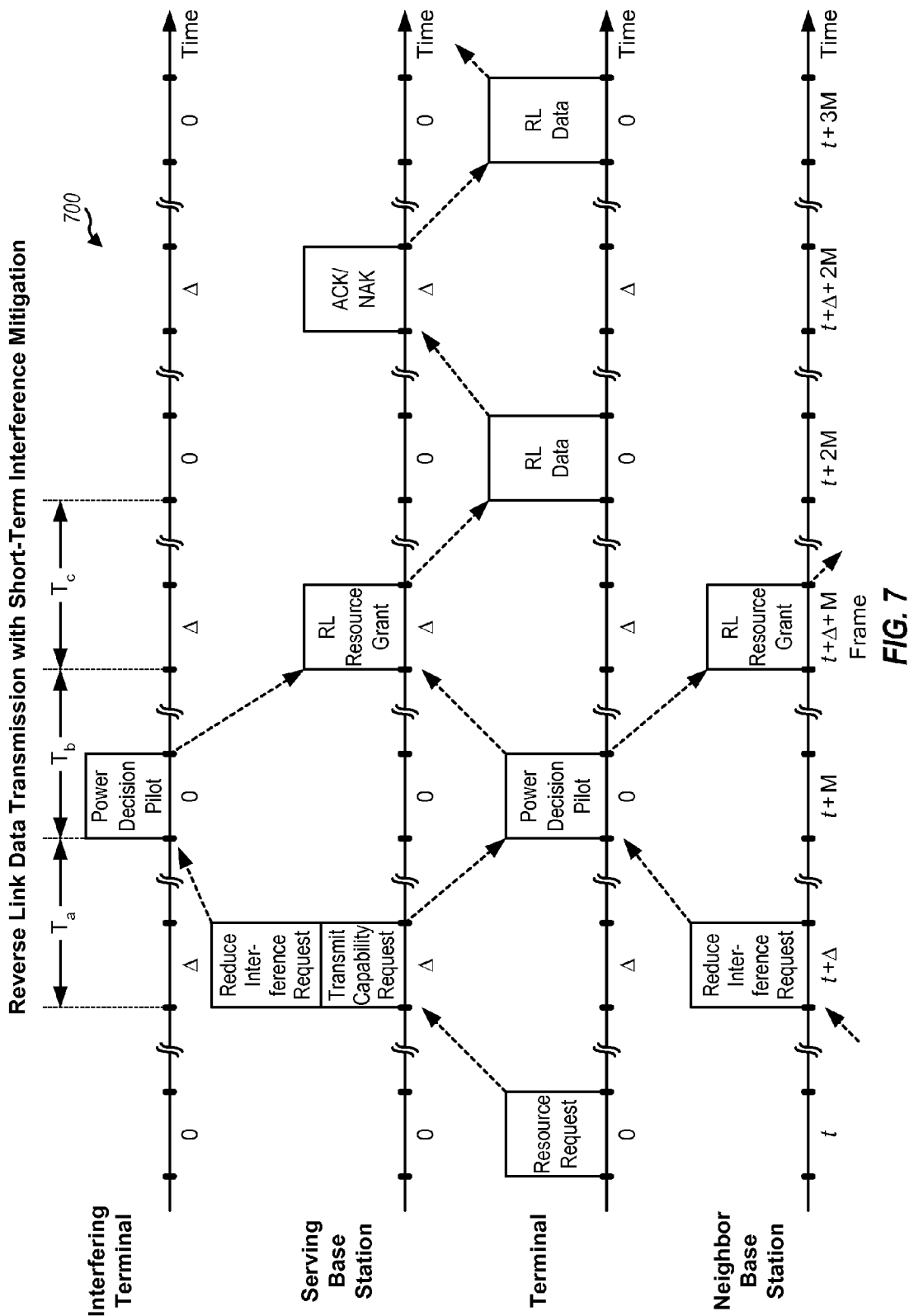
FIG. 7 shows RL data transmission with short-term interference mitigation.

FIG. 7 shows a timing diagram of a design of a scheme 700 for reverse link data transmission with short-term interference mitigation. A terminal may have data to send to a serving base station and may send a resource request in frame t. The resource request may include a buffer size at the terminal, an indication of the urgency of the resource request, etc. The resource request may be sent in any frame since it typically does not carry information on a specific resource. The serving base station may receive the resource request and may send a transmit capability request message to the terminal in frame t+Δ to ask for the transmit power capability of the terminal on a specific resource, e.g., to ask the terminal to transmit a power decision pilot on the specified resource. The transmit capability request message may include a priority metric for the request and/or other information. The serving base station may also send a reduce interference request message on the forward link in frame t+Δ to ask interfering terminals to reduce interference (e.g., to blank or lower their transmit powers to an acceptable level) on the specified resource. The reduce interference request message may include a priority metric indicating the urgency of the request, which may be used by the interfering terminals to make decisions on whether to grant or dismiss the request. The serving base station may send the transmit capability request message and the reduce interference request message in the same frame, as shown in FIG. 7, or in different frames.

The terminal may receive the transmit capability request message from the serving base station and may also receive reduce interference request messages from neighbor base stations. For simplicity, only one neighbor base station is shown in FIG. 7. The terminal may first determine whether or not to obey the reduce interference request message from each neighbor base station, e.g., based on the priority contained in the message. The terminal may then determine the maximum transmit power level that it can use on the specified resource based on the reduce interference request messages that the terminal will obey. The reduce interference request message from each neighbor base station may indicate the amount of interference that base station can tolerate and may be sent at a known transmit power level, which may be provided in the message or known a priori by the terminal. The terminal may estimate the pathloss for each neighbor base station based on the known transmit power level and the received power level of the reduce interference request message from that base station. The terminal may assume equal pathloss for the forward and reverse links and may determine the maximum transmit power level that the terminal can use in order to meet the interference requirement of each neighbor base station. The terminal may convey this maximum transmit power level via a power decision pilot that is sent at this transmit power level (or a scaled transmit power level) on a corresponding resource. The corresponding resource may cover the same frequency as the specified resource but may occur M frames earlier on the same reverse link HARQ interlace. The terminal may send the power decision pilot on the corresponding resource in frame t+M, and the transmit power level for this pilot may be the maximum transmit power level that the terminal can use for the specified resource in frame t+2M. The transmit capability request message from the serving base station in frame t+Δ may also carry a suggested transmit power level for the power decision pilot. In this case, the terminal may adjust the suggested transmit power level based on the reduce interference request messages received from the neighbor base stations.

The serving base station may receive the power decision pilots from the terminal as well as the interfering terminals and may estimate the channel quality of the specified resource based on the received pilots. The power decision pilots may allow the serving base station to more accurately estimate the channel quality and interference. For example, the serving base station may estimate the channel quality based on the pilot from the terminal, estimate interference based on the pilots from the interfering terminals, and determine an MCS for the terminal based on the channel equality estimate and the interference estimate. The serving base station may schedule the terminal for data transmission on the specified resource in accordance with the MCS. The serving base station may generate an RL resource grant, which may include the assigned resource, the MCS, an assigned transmit power level to use for the assigned resource, and/or other information. The assigned transmit power level may override the transmit power level indicated via the power decision pilot. The serving base station may send the RL resource grant to the terminal in frame t+Δ+M. The terminal may receive the RL resource grant from the serving base station and may obtain the assigned resource, the MCS, etc. The terminal may send a transmission of data on the assigned resource in frame t+2M.

The serving base station may receive the transmission of data from the terminal, decode the received transmission, and generate an ACK or a NAK based on the decoding result. The serving base station may send the ACK or NAK to the terminal in frame t+Δ+2M. The terminal may send another transmission of the data in frame t+3M if a NAK is received and may either terminate or send a transmission of new data if an ACK is received.

FIG. 7 shows a specific design of short-term interference mitigation on the reverse link. Short-term interference mitigation on the reverse link may also be implemented with other designs.

In the design shown in FIG. 7, the terminal may transmit a power decision pilot at the maximum transmit power level that it can use on the specified resource. In another design, the terminal may send a message containing the maximum transmit power level that it can use on the specified resource.

In one design, the interfering terminals may reduce interference for one HARQ transmission, which may be for the first transmission of a packet. The same procedure may be repeated for each HARQ transmission to reduce interference. In another design, the interfering terminals may reduce interference for L HARQ transmissions, e.g., on the same HARQ interlace, where L may be any integer value. In yet another design, the interfering terminals may reduce interference for multiple HARQ interlaces.

Figure 8:
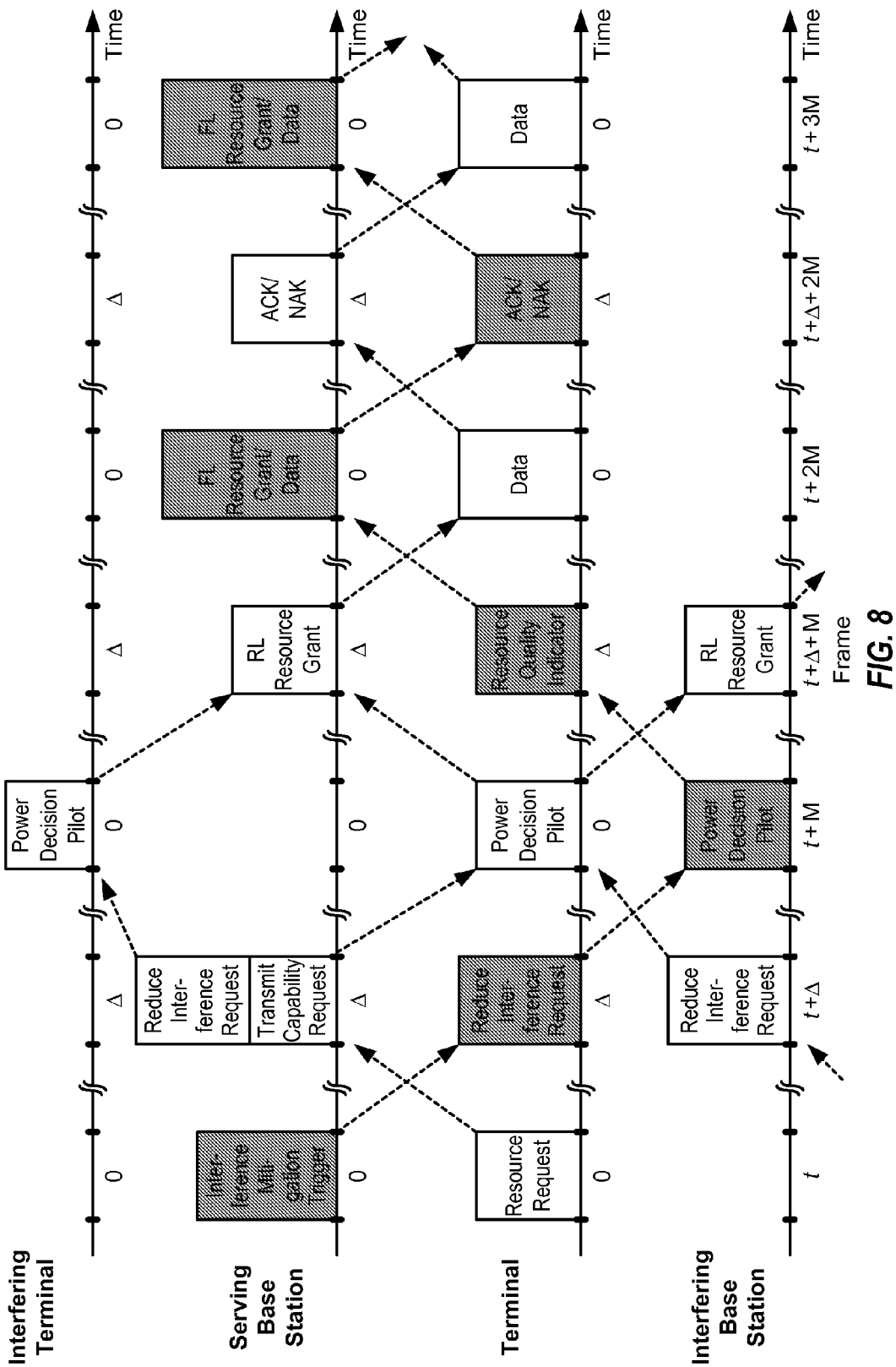
FIG. 8 shows multiplexing of FL data transmission and RL data transmission with short-term interference mitigation.

FIG. 8 shows a design of a scheme 800 for multiplexing forward link data transmission and reverse link data transmission with short-term interference mitigation. FIG. 8 may be obtained by superimposing FIGS. 5 and 7. For clarity, all of the transmissions for sending data on the forward link are shown with gray shading. As shown in FIG. 8, data transmissions on the forward and reverse links may be efficiently multiplexed.

FIGS. 5 and 7 show designs in which the forward link transmissions from the serving base station and the interfering base station are on one forward link HARQ interlace, and the reverse link transmissions from the terminal are on one reverse link HARQ interlace. These designs may simplify operation of short-term interference mitigation and may provide other advantages, as described below.

For the forward link short-term interference mitigation scheme shown in FIG. 5, an interference mitigation trigger message may cause a reduce interference request message to be sent $T_1$ frames later, which may cause a power decision pilot to be sent $T_2$ frames later, which may cause RQI information to be sent $T_3$ frames later, which may cause a transmission of data to be sent $T_4$ frames later, where $T_1$, $T_2$, $T_3$ and $T_4$ may each be any suitable value. The forward link transmissions may be sent on one HARQ interlace if $T_1+T_2=T_3+T_4=M$, as shown in FIG. 5. The reverse link transmissions may be sent on one HARQ interlace if $T_2+T_3=M$, as also shown in FIG. 5.

For the reverse link short-term interference mitigation scheme shown in FIG. 7, a transmit capability request message may cause a power decision pilot to be sent $T_a$ frames later, which may cause an RL resource grant to be sent $T_b$ frames later, which may cause a transmission of data to be sent $T_c$ frames later, where $T_a$, $T_b$ and $T_c$ may each be any suitable value. The forward link transmissions may be sent on one HARQ interlace if $T_a+T_b=M$, as shown in FIG. 7. The reverse link transmissions may be sent on one HARQ interlace if $T_b+T_c=M$, as also shown in FIG. 7.

In another design, interference mitigation trigger messages and reduce interference request messages for all HARQ interlaces may be sent in a single HARQ interlace. A bitmap may cover different frames for different HARQ interlaces and may indicate which messages are applicable for which HARQ interlaces.

In one design, the messages used for forward link short-term interference mitigation may be sent in frames that are separated by predetermined spacing, e.g., as shown in FIG. 5. Similarly, the messages used for reverse link short-term interference mitigation may be sent in frames that are separated by predetermined spacing, e.g., as shown in FIG. 7. This design can implicitly provide time information, which may simplify operation and reduce overhead. In another design, time information may be explicitly provided in messages. For example, a given message may request a response to be sent a specified number of frames later or may specify a resource in a particular number of frames later. This design may provide more flexibility.

The forward link short-term interference mitigation scheme in FIG. 5 may differ from the reverse link short-term interference mitigation scheme in FIG. 7 in several respects. For the forward link, the serving base station may send an interference mitigation trigger message to direct the terminal to send a reduce interference request message on the reverse link. For the reverse link, the serving base station may send a transmit capability request message to direct the terminal to send a power decision pilot on the reverse link.

The messages and pilot shown in Table 1 and FIGS. 5 and 7 may be sent in various manners and on various channels. Table 2 lists some channels that may be used for the messages and pilot in accordance with one design.

TABLE 2

| Message/Pilot | Send on ... | Description |
|---|---|---|
| Interference mitigation trigger | Forward link | Send on forward shared control channel (F-SCCH) or physical downlink control channel (PDCCH). |
| Transmit capability request | Forward link | Send on F-SCCH or PDCCH. |
| FL resource grant | Forward link | Send on F-SCCH or PDCCH. |
| RL resource grant | Forward link | Send on F-SCCH or PDCCH. |
| Reduce interference request | Forward link or reverse link | Send on forward link RUM channel (F-RUM) or PDCCH for forward link. Send on reverse link RUM channel (R-RUM) or physical uplink control channel (PUCCH) for reverse link. |
| Power decision pilot | Forward link or reverse link | Send on forward link power decision pilot channel (F-PDPICH) for forward link. Send on reverse link power decision pilot channel (R-PDPICH) for reverse link. |
| RQI | Reverse link | Send on RQI channel (R-RQICH) or PUCCH. |

The messages and pilot shown in Table 1 and FIGS. 5 and 7 may also be sent in other manners. In another design, the serving base station may send an interference mitigation trigger message or a transmit capability request message with forward link data to the terminal. In yet another design, the serving base station may send the interference mitigation trigger message and/or the reduce interference request message to neighbor base stations via the backhaul.

As noted above, the messages used for short-term interference mitigation may be sent such that they can be reliably received by the recipient stations. In one design, a reduce interference request message may be sent on the reverse link on a first segment that may be cleared of other reverse link transmissions. Similarly, a reduce interference request message may be sent on the forward link on a second segment that may be cleared of other forward link transmissions. This design may ensure that the reduce interference request messages can be reliably sent on the forward and reverse links. In general, the messages may be sent on control channels that may be orthogonalized with respect to the dominant interferers. The orthogonalization may be achieved by using resources (e.g., a set of subcarriers, a set of frames, etc.) that are not used by the dominant interferers.

In one design, the messages used for short-term interference mitigation may be sent on a single HARQ interlace on the forward link and on a single corresponding HARQ interlace on the reverse link. This design may allow for efficient resource partitioning between different base stations (e.g., of different power classes) as well as between an access link and a backhaul link of relay stations. For this design, resource partitioning may be achieved with a granularity of one HARQ interlace on each link, since the same HARQ interlace will also provide control transmission for the other link. For this design, if cooperation is needed from an interfering base station or an interfering terminal in order to enable reliable message reception, then this cooperation may be granted in units of HARQ interlaces. Such cooperation may take the form of control blanking or HARQ interlace partitioning. Confining the messages to a single HARQ interlace on each link may also support forwarding of the messages via relay stations. For example, a relay station may receive a reduce interference request message from the terminal and may forward the message upstream to the interfering base station or another relay station. The relay station may also receive a reduce interference request message from a base station and may forward the message downstream to the terminal or another relay station. The upstream/downstream partitioning may be carried out in units of HARQ interlaces. For example, the terminal may send a reduce interference request message on HARQ interlace a, and the relay station may forward the message on HARQ interlace b, where a≠b.

For both the forward and reverse links, the base stations may make pre-scheduling decisions in advance of actual scheduling, e.g., make a pre-scheduling decision when the interference mitigation trigger message is generated in FIG. 5 or when the transmit capability request message and the reduce interference request message are generated in FIG. 7. The actual scheduling decisions may or may not be the same as the pre-scheduling decisions depending on various factors. For example, if the estimated channel quality for a specified resource is poor, then the resource may not be assigned to the terminal.

On the forward link, the serving base station may send the interference mitigation trigger message for a specified resource to one terminal and may use this resource for this terminal, as described above. The serving base station may also use this resource for another terminal, e.g., if the scheduling decisions have changed after sending the interference mitigation trigger message. In this case, the serving base station may select the MCS for the other terminal using no RQI information or the most recent RQI information available for that terminal.

On the forward link, the serving base station may schedule terminals that do not observe high interference from neighbor base stations without sending interference mitigation trigger messages. On the reverse link, the serving base station may schedule terminals that are not strong interferers to neighbor base stations without sending transmit capability request messages. The serving base station may make these decisions based on pilot measurement reports from the terminals. Scheduling these terminals without using short-term interference mitigation whenever possible may allow for more efficient resource utilization.

In one design, overhead of messages for short-term interference mitigation may be reduced by subsampling. A scheduling period of S frames for each HARQ interlace may be used, where S may be determined by the desired amount of subsampling and may be any suitable integer value. A reduce interference request message may be sent once every S frames on a given HARQ interlace, and a scheduling decision may be valid for S frames on this HARQ interlace. The scheduling periods for different HARQ interlaces may be staggered in time in order to reduce initial latency caused by the subsampling.

In one design, an interference mitigation trigger message, a transmit capability request message, and/or a reduce interference request message may contain a persistence bit. This bit may be set to a first value (e.g., '0') to indicate that the message is valid for a nominal period of time (e.g., one frame) or to a second value (e.g., '1') to indicate that the message is valid for an extended period of time (e.g., a predetermined number of frames).

The short-term interference mitigation techniques described herein may be used for various deployment scenarios. The techniques may be used for a system in which all base stations are for macro cells. The techniques may be invoked for cell-edge terminals that may observe high interference from neighbor base stations on the forward link and/or may cause high interference to the neighbor base stations on the reverse link.

The techniques may also be used for a system supporting base stations transmitting at different power levels, e.g., for macro cells, pico cells, and femto cells. Some base stations may also be deployed in an unplanned manner, i.e., without any network planning. In addition, a base station may support restricted association and may not allow all terminals to connect to the base station. The restricted association may be useful, e.g., for a base station installed inside a home, where only users living in the home may be allowed to connect to the base station.

The techniques described herein may be advantageously used for dominant interference scenarios, which may be unavoidable or desirable. For example, a terminal may not be allowed to connect to a base station with the strongest received power, e.g., due to the base station allowing restricted association. This base station may then be the dominant interferer. As another example, the terminal may want to connect to a base station with lower received power if that base station has a lower pathloss. This may be the case, e.g., if the base station has a significantly lower transmit power level (e.g., for a pico cell or a femto cell) than that of other base stations and may thus cause less interference to the system to achieve a similar data rate, which is desirable. Other base stations with higher received power at the terminal would then be the dominant interferers. On the reverse link, transmissions sent to the base station with lower pathloss may cause lower interference in the system, which is desirable.

Figure 9:
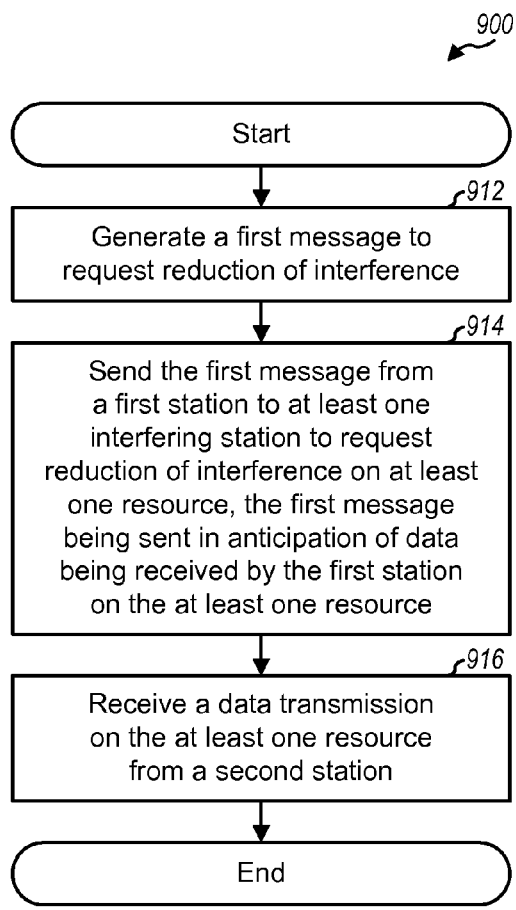
FIGS. 9 and 10 show a process and an apparatus, respectively, for receiving data with short-term interference mitigation.

FIG. 9 shows a design of a process 900 for receiving data with short-term interference mitigation. Process 900 may be performed by a first station, which may be a terminal for data transmission on the forward link or a serving base station for data transmission on the reverse link. Process 900 may be used for transmission scheme 500 in FIG. 5 or transmission scheme 700 in FIG. 7.

The first station may generate a first message to request reduction of interference (block 912). The first message may include information identifying at least one resource on which to reduce interference, an indication of the priority of the request, a target interference level for the first station, a target reduction in transmit power of an interfering station, spatial information usable by an interfering station to steer power in a direction different from the first station, and/or other information. The first station may send the first message to at least one interfering station to request reduction of interference on the at least one resource, e.g., in anticipation of data being received on the at least one resource (block 914). The first station may send the first message as a unicast message to each interfering station or as a broadcast message to all interfering stations. The first station may thereafter receive a data transmission on the at least one resource from a second station (block 916).

In one design, process 900 may be used for data transmission on the forward link, e.g., as shown in FIG. 5. In this case, the first station may be a terminal, and the second station may be a serving base station. The terminal may receive a second message to trigger short-term interference mitigation from the serving base station and may send the first message in response to receiving the second message.

In another design, process 900 may be used for data transmission on the reverse link, e.g., as shown in FIG. 7. In this case, the first station may be a serving base station, and the second station may be a terminal. The serving base station may receive a resource request from the terminal and may send the first message in response to receiving the resource request.

Figure 10:
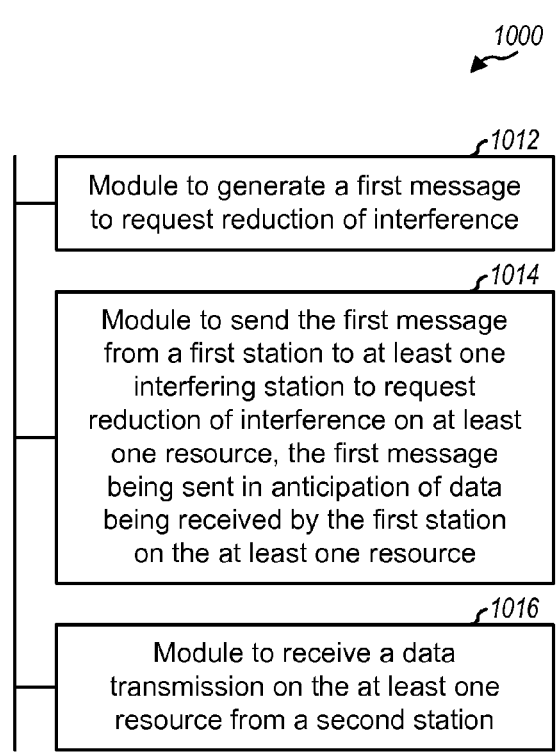

FIG. 10 shows a design of an apparatus 1000 for receiving data with short-term interference mitigation. Apparatus 1000 includes a module 1012 to generate a first message to request reduction of interference, a module 1014 to send the first message from a first station to at least one interfering station to request reduction of interference on at least one resource, the first message being sent in anticipation of data being received by the first station on the at least one resource, and a module 1016 to receive a data transmission on the at least one resource from a second station.

Figures 11, 12:
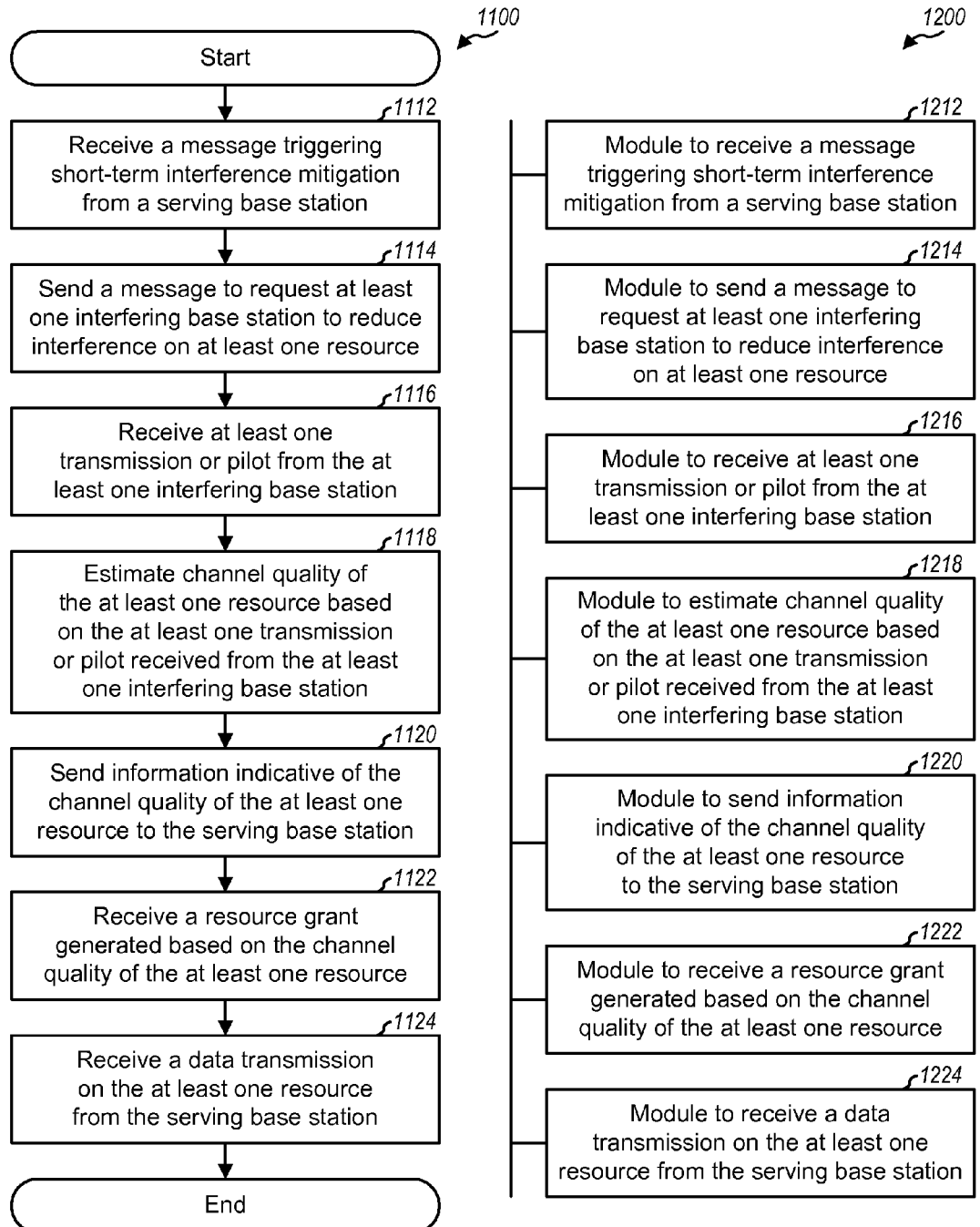
FIGS. 11 and 12 show a process and an apparatus, respectively, for receiving data on the forward link with short-term interference mitigation.

FIG. 11 shows a design of a process 1100 for receiving data on the forward link with short-term interference mitigation. Process 1100 may be performed by a terminal (as described below) or some other entity. Process 1100 may be used for transmission scheme 500 in FIG. 5.

The terminal may receive a message triggering short-term interference mitigation from a serving base station (block 1112). The terminal may send a message to request at least one interfering base station to reduce interference on at least one resource (block 1114). The terminal may send the request message in anticipation of receiving data on the at least one resource, e.g., in response to receiving the trigger message in block 1112. The terminal may receive at least one transmission or pilot from the at least one interfering base station (block 1116). Each transmission or pilot may indicate a transmit power level to be used on the at least one resource by a corresponding interfering base station. The terminal may estimate channel quality of the at least one resource based on the at least one transmission or pilot from the at least one interfering base station (block 1118). The terminal may send information indicative of the channel quality of the at least one resource to the serving base station (block 1120). The terminal may receive a resource grant generated based on the channel quality of the at least one resource (block 1122). The terminal may also receive a data transmission on the at least one resource from the serving base station (block 1124). The terminal may receive the at least one transmission or pilot on the at least one resource in a first time period and may receive the data transmission on the at least one resource in a second time period later than the first time period.

FIG. 12 shows a design of an apparatus 1200 for receiving data on the forward link with short-term interference mitigation. Apparatus 1200 includes a module 1212 to receive a message triggering short-term interference mitigation from a serving base station, a module 1214 to send a message to request at least one interfering base station to reduce interference on at least one resource, the request message being sent in anticipation of data being received on the at least one resource, a module 1216 to receive at least one transmission or pilot from the at least one interfering base station, a module 1218 to estimate channel quality of the at least one resource based on the at least one transmission or pilot from the at least one interfering base station, a module 1220 to send information indicative of the channel quality of the at least one resource to the serving base station, a module 1222 to receive a resource grant generated based on the channel quality of the at least one resource, and a module 1224 to receive a data transmission on the at least one resource from the serving base station.

FIG. 13 shows a design of a process 1300 for receiving data on the reverse link with short-term interference mitigation. Process 1300 may be performed by a serving base station (as described below) or some other entity. Process 1300 may be used for transmission scheme 700 in FIG. 7.

The serving base station may receive a resource request from a terminal (block 1312). The serving base station may send a first message to request at least one interfering terminal to reduce interference on at least one resource (block 1314). The serving base station may send the first message in anticipation of receiving data on the at least one resource, e.g., in response to receiving the resource request. The serving base station may also send a second message to request transmit capability of the terminal for the at least one resource (block 1316). The serving base station may receive a transmission (e.g., a power decision pilot) comprising the transmit capability of the terminal for the at least one resource (block 1318). The serving base station may schedule the terminal for data transmission based on the transmit capability of the terminal for the at least one resource (block 1320). The serving base station may then receive a data transmission on the at least one resource from the terminal (block 1322).

In one design, the serving base station may receive pilots from the terminal and the at least one interfering terminal, with each pilot being transmitted by a corresponding terminal at a maximum transmit power level usable for the at least one resource. The serving base station may estimate channel quality of the at least one resource based on the received pilots and may select a modulation and coding scheme based on the estimated channel quality of the at least one resource. The serving base station may send a resource grant comprising the modulation and coding scheme to the terminal. The terminal may send the data transmission in accordance with the resource grant.

FIG. 14 shows a design of an apparatus 1400 for receiving data on the reverse link with short-term interference mitigation. Apparatus 1400 includes a module 1412 to receive a resource request from a terminal, a module 1414 to send a first message to request at least one interfering terminal to reduce interference on at least one resource, the first message being sent in anticipation of data being received on the at least one resource, a module 1416 to send a second message to request transmit capability of the terminal for the at least one resource, a module 1418 to receive a transmission comprising the transmit capability of the terminal for the at least one resource, a module 1420 to schedule the terminal for data transmission based on the transmit capability of the terminal for the at least one resource, and a module 1422 to receive a data transmission on the at least one resource from the terminal.

Figure 15:
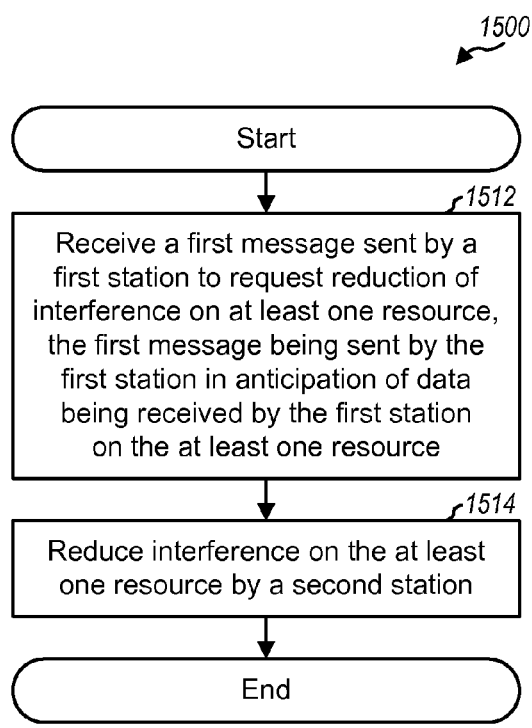
FIGS. 15 and 16 show a process and an apparatus, respectively, for reducing interference.

FIG. 15 shows a design of a process 1500 for reducing interference. Process 1500 may be performed by an interfering station, which may be an interfering base station for data transmission on the forward link or an interfering terminal for data transmission on the reverse link. Process 1500 may be used for transmission scheme 500 in FIG. 5 or transmission scheme 700 in FIG. 7.

The interfering station may receive a first message sent by a first station to request reduction of interference on at least one resource (block 1512). The first message may be sent by the first station in anticipation of data being received by the first station on the at least one resource. In one design, the interfering station may obtain the priority of the request from the first message. The interfering station may then determine whether to grant or dismiss the request based on the priority of the request. The interfering station may reduce interference on the at least one resource (block 1514).

In one design of block 1514, the interfering station may obtain a target reduction in transmit power from the first message. The interfering station may then reduce its transmit power on the at least one resource by an amount determined based on the target reduction in transmit power. In another design of block 1514, the interfering station may obtain spatial information from the first message. The interfering station may then perform precoding based on the spatial information to steer its power in a direction different from the first station. The interfering station may also reduce interference on the at least one resource in other manners.

Figure 16:
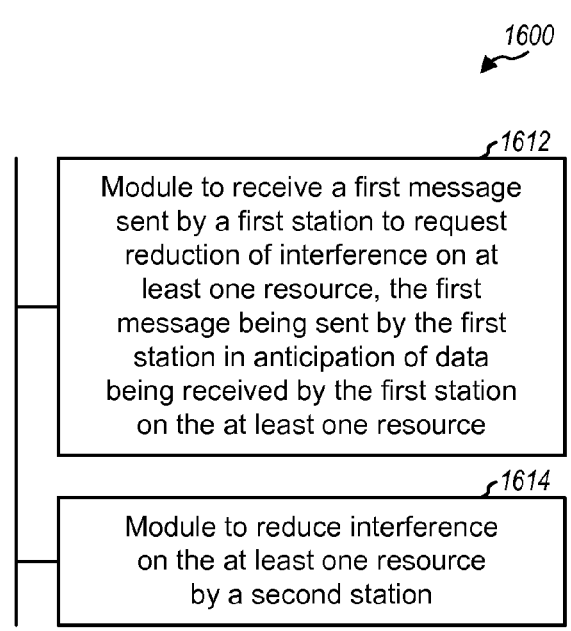

FIG. 16 shows a design of an apparatus 1600 for reducing interference. Apparatus 1600 includes a module 1612 to receive a first message sent by a first station to request reduction of interference on at least one resource, the first message being sent by the first station in anticipation of data being received by the first station on the at least one resource, and a module 1614 to reduce interference on the at least one resource.

The modules in FIGS. 10, 12, 14 and 16 may comprise processors, electronics devices, hardware devices, electronics components, logical circuits, memories, etc., or any combination thereof.

Figure 17:
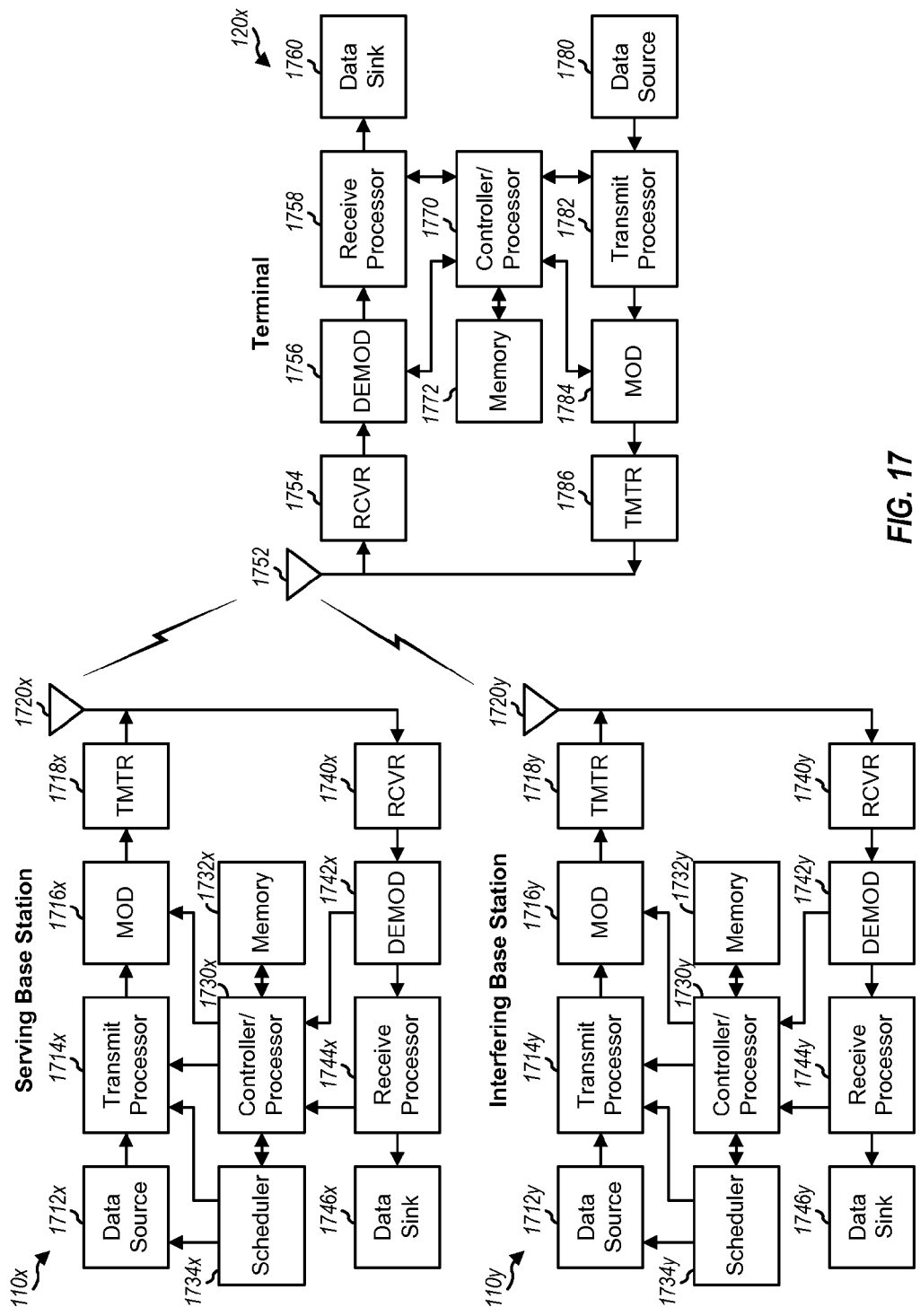
FIG. 17 shows a block diagram of a terminal and two base stations.

FIG. 17 shows a block diagram of a design of serving base station 110$x$, interfering base station 110$y$, and terminal 120$x$ in FIGS. 4 and 6. At serving base station 110$x$, a transmit processor 1714$x$ may receive traffic data from a data source 1712$x$ and messages from a controller/processor 1730$x$ and a scheduler 1734$x$. For example, controller/processor 1730$x$ may provide messages for short-term interference mitigation shown in FIGS. 5 and 7. Scheduler 1734$x$ may provide resource grants for terminal 120$x$. Transmit processor 1714$x$ may process (e.g., encode, interleave, and symbol map) the traffic data, messages, and pilot and provide data symbols, control symbols, and pilot symbols, respectively. A modulator (MOD) 1716x may perform modulation on the data, control, and pilot symbols (e.g., for OFDM, CDMA, etc.) and provide output samples. A transmitter (TMTR) 1718x may condition (e.g., convert to analog, amplify, filter, and upconvert) the output samples and generate a forward link signal, which may be transmitted via an antenna 1720x.

Interfering base station 110y may similarly process traffic data and messages for the terminals served by base station 110y and interfering terminals. The traffic data, messages, and pilot may be processed by a transmit processor 1714y, modulated by a modulator 1716y, conditioned by a transmitter 1718y, and transmitted via an antenna 1720y.

At terminal 120x, an antenna 1752 may receive the forward link signals from base stations 110x and 110y and possibly other base stations. A receiver (RCVR) 1754 may condition (e.g., filter, amplify, downconvert, and digitize) a received signal from antenna 1752 and provide samples. A demodulator (DEMOD) 1756 may perform demodulation on the samples and provide detected symbols. A receive processor 1758 may process (e.g., symbol demap, deinterleave, and decode) the detected symbols, provide decoded traffic data to a data sink 1760, and provide decoded messages (e.g., for resource grants and short-term interference mitigation) to a controller/processor 1770. Demodulator 1756 may estimate the channel quality of specified resources and may provide the estimated channel quality to controller/processor 1770.

On the reverse link, a transmit processor 1782 may receive and process traffic data from a data source 1780 and messages (e.g., for resource requests and short-term interference mitigation) from controller/processor 1770 and provide data and control symbols. A modulator 1784 may perform modulation on the data, control, and pilot symbols and may provide output samples. A transmitter 1786 may condition the output samples and generate a reverse link signal, which may be transmitted via antenna 1752.

At each base station, the reverse link signals from terminal 120x and other terminals may be received by antenna 1720, conditioned by a receiver 1740, demodulated by a demodulator 1742, and processed by a receive processor 1744. Processor 1744 may provide decoded traffic data to a data sink 1746 and decoded messages to controller/processor 1730. Demodulator 1742 may estimate the channel quality of one or more resources for terminal 120x and may provide this information to controller/processor 1730. Controller/processor 1730 may select MCS and/or other parameters for terminal 120x.

Controllers/processors 1730x, 1730y and 1770 may direct the operation at base stations 110x and 110y and terminal 120x, respectively. Memories 1732a, 1732y and 1772 may store data and program codes for base stations 110x and 110y and terminal 120x, respectively. Schedulers 1734x and 1734y may schedule terminals communicating with base stations 110x and 110y, respectively, and may assign resources to the terminals.

The processors shown in FIG. 17 may perform various functions for the techniques described herein. For example, the processors at terminal 120x may direct or implement process 900 in FIG. 9, process 1100 in FIG. 11, process 1500 in FIG. 15, and/or other processes for the techniques described herein. The processors at each base station 110 may direct or implement process 900 in FIG. 9, process 1300 in FIG. 13, process 1500 in FIG. 15, and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communication, comprising:
   obtaining an indication to invoke interference mitigation for a first station in response to the first station observing high interference from at least one interfering station;
   determining at least one resource on which to request reduction of interference in response to the indication to invoke interference mitigation, the at least one resource corresponding to a portion of a system bandwidth available for use for communication;
   sending a first message from the first station to the at least one interfering station to request reduction of interference on the at least one resource, the first message being intended for only the at least one interfering station and being sent in anticipation of data being received by the first station on the at least one resource; and
   receiving a data transmission on the at least one resource from a second station.

2. The method of claim 1, wherein the first station is a terminal and the second station is a base station, and wherein the data is received on forward link.

3. The method of claim 1, wherein the first station is a base station and the second station is a terminal, and wherein the data is received on reverse link.

4. The method of claim 1, further comprising:
   generating the first message to include information identifying the at least one resource.

5. The method of claim 1, further comprising:
   generating the first message to include an indication of priority of the request.

6. The method of claim 1, further comprising:
   generating the first message to include a target reduction in transmit power of an interfering station.

7. The method of claim 1, further comprising:
   generating the first message to include a target interference level for the first station.

8. The method of claim 1, further comprising:
   generating the first message to include spatial information usable by an interfering station to steer power in a direction different from the first station.

9. The method of claim 1, wherein the sending the first message comprises sending the first message as a broadcast message to all of the at least one interfering station.

10. The method of claim 1, wherein the sending the first message comprises sending the first message as a unicast message to each of the at least one interfering station.

11. The method of claim 1, further comprising:
    receiving from the second station a second message to invoke interference mitigation for the first station, wherein the first message is sent in response to receiving the second message.

12. The method of claim 1, further comprising:
    receiving a resource request from the second station, wherein the first message is sent in response to receiving the resource request.

13. An apparatus for wireless communication, comprising:
    at least one processor configured to:
      obtain an indication to invoke interference mitigation for a first station in response to the first station observing high interference from at least one interfering station;
      determine at least one resource on which to request reduction of interference in response to the indication to invoke interference mitigation, the at least one resource corresponding to a portion of a system bandwidth available for use for communication,
      send a first message from the first station to the at least one interfering station to request reduction of interference on the at least one resource, the first message being intended for only the at least one interfering station and being sent in anticipation of data being received by the first station on the at least one resource, and
      receive a data transmission on the at least one resource from a second station.

14. The apparatus of claim 13, wherein the at least one processor is configured to generate the first message to include at least one of information identifying the at least one resource, an indication of priority of the request, a target interference level for the first station, a target reduction in transmit power of an interfering station, or spatial information usable by an interfering station to steer power in a direction different from the first station.

15. The apparatus of claim 13, wherein the at least one processor is configured to receive from the second station a second message to invoke interference mitigation for the first station, and to send the first message in response to receiving the second message.

16. The apparatus of claim 13, wherein the at least one processor is configured to receive a resource request from the second station and to send the first message in response to receiving the resource request.

17. An apparatus for wireless communication, comprising:
    means for obtaining an indication to invoke interference mitigation for a first station in response to the first station observing high interference from at least one interfering station;
    means for determining at least one resource on which to request reduction of interference in response to the indication to invoke interference mitigation, the at least one resource corresponding to a portion of a system bandwidth available for use for communication;
    means for sending a first message from the first station to the at least one interfering station to request reduction of interference on the at least one resource, the first message being intended for only the at least one interfering station and being sent in anticipation of data being received by the first station on the at least one resource; and means for receiving a data transmission on the at least one resource from a second station.

18. The apparatus of claim 17, further comprising:
means for generating the first message to include at least one of information identifying the at least one resource, an indication of priority of the request, a target interference level for the first station, a target reduction in transmit power of an interfering station, or spatial information usable by an interfering station to steer power in a direction different from the first station.

19. The apparatus of claim 17, further comprising:
means for receiving from the second station a second message to invoke interference mitigation for the first station, wherein the first message is sent in response to receiving the second message.

20. The apparatus of claim 17, further comprising:
means for receiving a resource request from the second station, and wherein the first message is sent in response to receiving the resource request.

21. A computer program product, comprising:
a non-transitory computer-readable medium comprising:
code for causing at least one computer to obtain an indication to invoke interference mitigation for a first station in response to the first station observing high interference from at least one interfering station;
code for causing the at least one computer to determine at least one resource on which to request reduction of interference in response to the indication to invoke interference mitigation, the at least one resource corresponding to a portion of a system bandwidth available for use for communication;
code for causing the at least one computer to send a first message from the first station to the at least one interfering station to request reduction of interference on the at least one resource, the first message being intended for only the at least one interfering station and being sent in anticipation of data being received by the first station on the at least one resource, and
code for causing the at least one computer to receive a data transmission on the at least one resource from a second station.

22. A method for wireless communication, comprising:
receiving a first message sent by a first station to request reduction of interference on at least one resource, the first message being sent by the first station in response to an indication to invoke interference mitigation due to the first station observing high interference from at least one interfering station, the first message being intended for only the at least one interfering station and being sent in anticipation of data being received by the first station on the at least one resource;
determining the at least one resource on which to reduce interference based on the first message, the at least one resource corresponding to a portion of a system bandwidth available for use for communication; and
reducing interference on the at least one resource by a second station.

23. The method of claim 22, further comprising:
obtaining priority of the request from the first message; and
determining whether to grant or dismiss the request based on the priority of the request.

24. The method of claim 22, wherein the reducing interference comprises
obtaining a target reduction in transmit power from the first message, and
reducing transmit power of the second station on the at least one resource by an amount determined based on the target reduction in transmit power.

25. The method of claim 22, wherein the reducing interference comprises
obtaining spatial information from the first message, and
performing precoding based on the spatial information to steer power of the second station in a direction different from the first station.

26. An apparatus for wireless communication, comprising:
at least one processor configured to:
receive a first message sent by a first station to request reduction of interference on at least one resource, the first message being sent by the first station in response to an indication to invoke interference mitigation due to the first station observing high interference from at least one interfering station, the first message being intended for only the at least one interfering station and being sent in anticipation of data being received by the first station on the at least one resource,
determine the at least one resource on which to reduce interference based on the first message, the at least one resource corresponding to a portion of a system bandwidth available for use for communication, and
reduce interference on the at least one resource by a second station.

27. The apparatus of claim 26, wherein the at least one processor is configured to obtain priority of the request from the first message and to determine whether to grant or dismiss the request based on the priority of the request.

28. The apparatus of claim 26, wherein the at least one processor is configured to obtain a target reduction in transmit power from the first message and to reduce transmit power of the second station on the at least one resource by an amount determined based on the target reduction in transmit power.

29. The apparatus of claim 26, wherein the at least one processor is configured to obtain spatial information from the first message and to perform precoding based on the spatial information to steer power of the second station in a direction different from the first station.

30. A method for wireless communication, comprising:
obtaining an indication to invoke interference mitigation for a terminal in response to the terminal observing high interference from at least one interfering base station;
determining at least one resource on which to request reduction of interference in response to the indication to invoke interference mitigation, the at least one resource corresponding to a portion of a system bandwidth available for use for communication;
sending a first message from the terminal to request the at least one interfering base station to reduce interference on the at least one resource, the first message being intended for only the at least one interfering base station and being sent in anticipation of data being received by the terminal on the at least one resource; and
receiving a data transmission on the at least one resource from a serving base station.

31. The method of claim 30, further comprising:
receiving from the serving base station a second message invoking interference mitigation for the terminal, wherein the first message is sent in response to receiving the second message.

32. The method of claim 30, further comprising:
receiving at least one transmission or pilot from the at least one interfering base station, each transmission or pilot indicating a transmit power level to be used on the at least one resource by a corresponding interfering base station.

33. The method of claim 32, further comprising:
estimating channel quality of the at least one resource based on the at least one transmission or pilot from the at least one interfering base station; and
sending information indicative of the channel quality of the at least one resource to the serving base station.

34. The method of claim 30, further comprising:
receiving at least one pilot on the at least one resource from the at least one interfering base station in a first time period, wherein the data transmission is received on the at least one resource in a second time period later than the first time period.

35. An apparatus for wireless communication, comprising:
at least one processor configured to:
obtain an indication to invoke interference mitigation for a terminal in response to the terminal observing high interference from at least one interfering base station,
determine at least one resource on which to request reduction of interference in response to the indication to invoke interference mitigation, the at least one resource corresponding to a portion of a system bandwidth available for use for communication,
send a first message from the terminal to request the at least one interfering base station to reduce interference on the at least one resource, the first message being intended for only the at least one interfering base station and being sent in anticipation of data being received by the terminal on the at least one resource, and
receive a data transmission on the at least one resource from a serving base station.

36. The apparatus of claim 35, wherein the at least one processor is configured to receive from the serving base station a second message invoking interference mitigation for the terminal, and to send the first message in response to receiving the second message.

37. The apparatus of claim 35, wherein the at least one processor is configured to receive at least one pilot from the at least one interfering base station, each pilot being sent at a transmit power level to be used on the at least one resource by a corresponding interfering base station, to estimate channel quality of the at least one resource based on the at least one pilot from the at least one interfering base station, and to send information indicative of the channel quality of the at least one resource to the serving base station.

38. A method for wireless communication, comprising:
obtaining an indication to invoke interference mitigation for a base station in response to the base station observing high interference from at least one interfering terminal;
determining at least one resource on which to request reduction of interference in response to the indication to invoke interference mitigation, the at least one resource corresponding to a portion of a system bandwidth available for use for communication;
sending a first message from the base station to request the at least one interfering terminal to reduce interference on the at least one resource, the first message being intended for only the at least one interfering terminal and being sent in anticipation of data being received by the base station on the at least one resource; and
receiving a data transmission on the at least one resource from a terminal.

39. The method of claim 38, further comprising:
sending a second message to request transmit capability of the terminal for the at least one resource;
receiving a transmission comprising the transmit capability of the terminal for the at least one resource; and
scheduling the terminal for the data transmission based on the transmit capability of the terminal for the at least one resource.

40. The method of claim 38, further comprising:
receiving pilots from the terminal and the at least one interfering terminal, each pilot being transmitted by a corresponding terminal at a maximum transmit power level usable for the at least one resource;
estimating channel quality of the at least one resource based on the received pilots;
selecting a modulation and coding scheme based on the estimated channel quality of the at least one resource; and
sending a resource grant comprising the modulation and coding scheme to the terminal.

41. An apparatus for wireless communication, comprising:
at least one processor configured to:
obtain an indication to invoke interference mitigation for a base station in response to the base station observing high interference from at least one interfering terminal,
determine at least one resource on which to request reduction of interference in response to the indication to invoke interference mitigation, the at least one resource corresponding to a portion of a system bandwidth available for use for communication,
send a first message from the base station to request the at least one interfering terminal to reduce interference on the at least one resource, the first message being intended for only the at least one interfering terminal and being sent in anticipation of data being received by the base station on the at least one resource, and
receive a data transmission on the at least one resource from a terminal.

42. The apparatus of claim 41, wherein the at least one processor is configured to send a second message to request transmit capability of the terminal for the at least one resource, to receive a transmission comprising the transmit capability of the terminal for the at least one resource, and to schedule the terminal for the data transmission based on the transmit capability of the terminal for the at least one resource.

43. The apparatus of claim 41, wherein the at least one processor is configured to receive pilots from the terminal and the at least one interfering terminal, each pilot being transmitted by a corresponding terminal at a maximum transmit power level usable for the at least one resource, to estimate channel quality of the at least one resource based on the received pilots, to select a modulation and coding scheme based on the estimated channel quality of the at least one resource, and to send a resource grant comprising the modulation and coding scheme to the terminal.

* * * * *